(12) United States Patent
Heo et al.

(10) Patent No.: US 11,064,205 B2
(45) Date of Patent: Jul. 13, 2021

(54) IMAGE DECODING METHOD AND DEVICE ACCORDING TO INTRA PREDICTION IN IMAGE CODING SYSTEM

(71) Applicant: LG ELECTRONICS INC., Seoul (KR)

(72) Inventors: Jin Heo, Seoul (KR); Seunghwan Kim, Seoul (KR); Jaehyun Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 59 days.

(21) Appl. No.: 16/496,288

(22) PCT Filed: Sep. 28, 2017

(86) PCT No.: PCT/KR2017/010780
§ 371 (c)(1),
(2) Date: Nov. 14, 2019

(87) PCT Pub. No.: WO2018/174358
PCT Pub. Date: Sep. 27, 2018

(65) Prior Publication Data
US 2021/0112252 A1    Apr. 15, 2021

Related U.S. Application Data

(60) Provisional application No. 62/474,577, filed on Mar. 21, 2017.

(51) Int. Cl.
*H04N 19/159*    (2014.01)
*H04N 19/124*    (2014.01)
*H04N 19/105*    (2014.01)
*H04N 19/176*    (2014.01)

(52) U.S. Cl.
CPC ......... *H04N 19/159* (2014.11); *H04N 19/105* (2014.11); *H04N 19/124* (2014.11); *H04N 19/176* (2014.11)

(58) Field of Classification Search
CPC .. H04N 19/159; H04N 19/105; H04N 19/124; H04N 19/176
See application file for complete search history.

(56) References Cited

U.S. PATENT DOCUMENTS

2013/0215963 A1* 8/2013 Yie ................ H04N 19/176
375/240.03
2013/0251036 A1* 9/2013 Lee ................ H04N 19/61
375/240.12
2017/0353730 A1* 12/2017 Liu ................ H04N 19/105

FOREIGN PATENT DOCUMENTS

KR     10-0967521 B1     7/2010
KR     2013-0118219 A    10/2013
KR     10-1444667 B1     9/2014
(Continued)

*Primary Examiner* — Jared Walker
(74) *Attorney, Agent, or Firm* — Dentons US LLP

(57) ABSTRACT

An intra prediction method performed by a decoding device, according to the present disclosure, comprises the steps of: deriving an intra prediction mode for a current block; deriving neighboring samples of the current block; deriving reference samples for a target sample of the current block among the neighboring samples on the basis of the intra prediction mode; deriving weighted values of the reference samples for the target sample; and deriving a prediction sample of the target sample on the basis of the reference samples and the weighted values.

8 Claims, 13 Drawing Sheets

(56) References Cited

FOREIGN PATENT DOCUMENTS

KR 10-1573339 B1 12/2015
KR 2015-0140848 A 12/2015

* cited by examiner

Target sample (410)

Target sample (510)

IMAGE DECODING METHOD AND DEVICE ACCORDING TO INTRA PREDICTION IN IMAGE CODING SYSTEM

CROSS-REFERENCE TO RELATED APPLICATIONS

This application is the National Stage filing under 35 U.S.C. 371 of International Application No. PCT/KR2017/010780, filed on Sep. 28, 2017, which claims the benefit of U.S. Provisional Application No. 62/474,577 filed on Mar. 21, 2017, the contents of which are all hereby incorporated by reference herein in their entirety.

BACKGROUND OF THE DISCLOSURE

Field of the Disclosure

The present disclosure relates to an image coding technology and, most particularly, to an image decoding method and device according to intra-prediction in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high-quality images.

SUMMARY

Technical Objects

A technical object of the present disclosure is to provide a method and device that can enhance image coding efficiency.

Another technical object of the present disclosure is to provide an intra-prediction method and device that are performed based on at least one neighboring sample of a current block.

Yet another technical object of the present disclosure is to provide an intra-prediction method and device that can derive a prediction sample of a target sample by using a weighted sum of reference samples of the target sample of a current block.

Yet another technical object of the present disclosure is to provide an intra-prediction method and device that can derive weighted values of reference samples for a target sample of a current block by using a cosine function.

A further technical object of the present disclosure is to provide an intra-prediction method and device that can that can derive weighted values of reference samples for a target sample based on a prediction sample that is derived based on an original sample of a target sample of a current block and reference samples of the current block.

Technical Solutions

According to an exemplary embodiment of the present disclosure, provided herein is an intra-prediction method performed by a decoding device. The method may include the steps of deriving an intra-prediction mode for a current block, deriving neighboring samples of the current block, deriving reference samples for a target sample of the current block, among the neighboring samples, based on the intra-prediction mode, deriving weighted values of reference samples for the target sample, and deriving a prediction sample of the target sample based on the reference samples and the weighted values.

According to another exemplary embodiment of the present disclosure, provided herein is a decoding device performing image decoding based on intra-prediction. The decoding device may include an entropy decoder configured for acquiring prediction information for a current block, and a predictor configured for deriving neighboring samples of the current block, deriving reference samples for a target sample of the current block, among the neighboring samples, based on the intra-prediction mode, deriving weighted values of reference samples for the target sample, and deriving a prediction sample of the target sample based on the reference samples and the weighted values.

According to an exemplary embodiment of the present disclosure, provided herein is an intra-prediction method performed by an encoding device. The method may include the steps of deriving an intra-prediction mode for a current block, deriving neighboring samples of the current block, deriving reference samples for a target sample of the current block, among the neighboring samples, based on the intra-prediction mode, deriving weighted values of reference samples for the target sample, deriving a prediction sample of the target sample based on the reference samples and the weighted values, and generating and encoding prediction information for the current block and outputting the encoded information.

According to a further exemplary embodiment of the present disclosure, provided herein is an encoding device performing image decoding based on intra-prediction. The encoding device may include a predictor configured for determining an intra-prediction mode for a current block, deriving neighboring samples of the current block, deriving reference samples for a target sample of the current block, among the neighboring samples, based on the intra-prediction mode, deriving weighted values of reference samples for the target sample, and deriving a prediction sample of the target sample based on the reference samples and the weighted values, and an entropy encoder configured for generating and encoding prediction information for a current block and outputting the encoded information.

Effects of the Disclosure

According to the above-described present disclosure, by performing intra-prediction based on at least one neighboring sample, among a plurality of neighboring samples, prediction accuracy of the current block may be enhanced, thereby enhancing the overall coding efficiency.

Additionally, according to the present disclosure, in case a planar mode for a current block is applied, intra-prediction is performed based on neighboring samples of the same column as a target sample of the current block and neighboring samples of the same row as the target sample, so as to enhance prediction accuracy of the current block, thereby enhancing the overall coding efficiency.

Additionally, according to the present disclosure, reference samples for a target sample of a current block may be derived based on an intra-prediction mode for the current block, and a prediction sample of the target sample may be derived by using a weighted sum of the neighboring samples by deriving weighted values of the neighboring samples based on a cosine function. Thus, prediction accuracy of the current block may be enhanced, thereby enhancing the overall coding efficiency.

DESCRIPTION OF EXEMPLARY EMBODIMENTS

Figure 1:
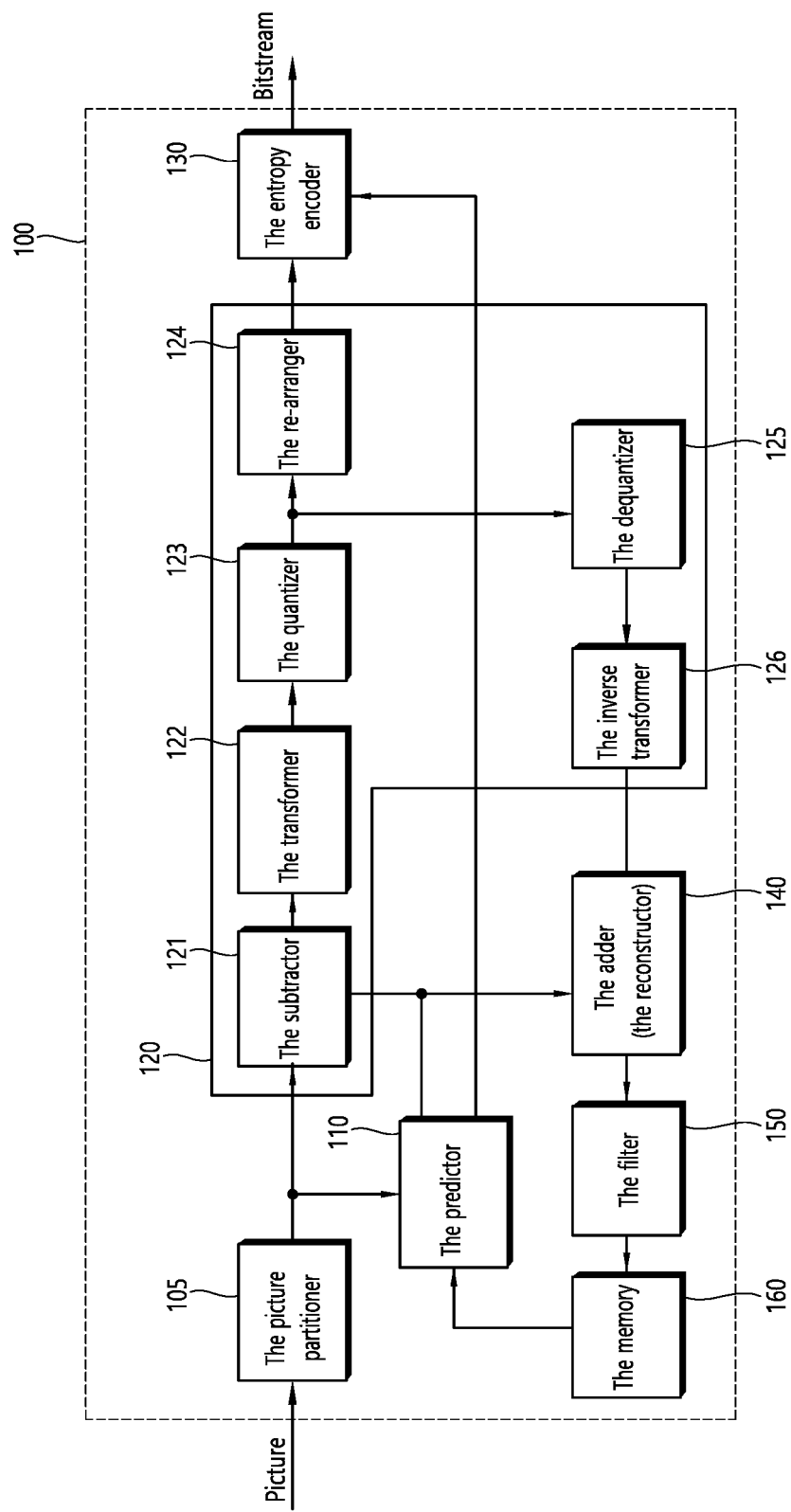
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device (100) may include a picture partitioner (105), a predictor (110), a subtractor (115), a transformer (120), a quantizer (125), a re-arranger (130), an entropy encoder (135), a residual processor (140), an adder (150), a filter (155), and a memory (160). The residual processor (140) may include a dequantizer (141) and an inverse transformer (142).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor (115) generates a residual sample which is a difference between an original sample and a prediction sample. If the skip mode is applied, the residual sample may not be generated as described above.

The transformer (120) transforms residual samples in units of a transform block to generate a transform coefficient. The transformer (120) may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (125) may quantize the transform coefficients to generate quantized transform coefficients.

The re-arranger (130) rearranges quantized transform coefficients. The re-arranger (130) may rearrange the quantized transform coefficients in the form of a block into a one-dimensional vector through a coefficient scanning method. Although the re-arranger (130) is described as a separate component, the re-arranger (130) may be a part of the quantizer (125).

The entropy encoder (135) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (135) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (141) dequantizes values (transform coefficients) quantized by the quantizer (125) and the inverse transformer (142) inversely transforms values dequantized by the dequantizer (141) to generate a residual sample.

The adder (150) adds a residual sample to a prediction sample to reconstruct a picture. The residual sample may be added to the prediction sample in units of a block to generate a reconstructed block. Although the adder (150) is described as a separate component, the adder (150) may be a part of the predictor (110). Meanwhile, the adder (150) may be referred to as a reconstructor or reconstructed block generator.

The filter (155) may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter (155) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (155). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
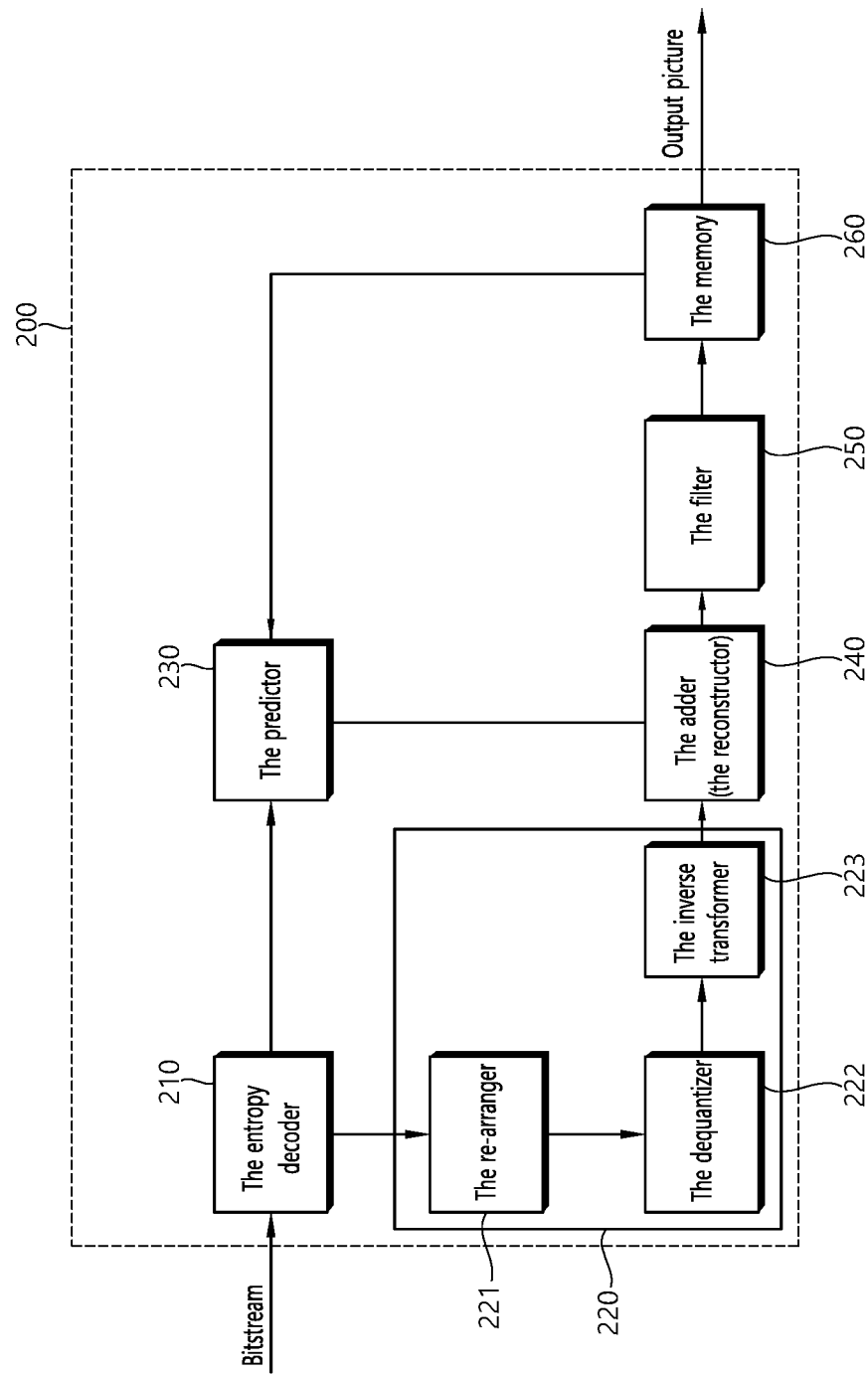
FIG. 2 is a schematic diagram illustrating a configuration of a video decoding device to which the present disclosure is applicable.

FIG. 2 briefly illustrates a structure of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in association with a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder (210) may be provided to the predictor (250) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor (230) may derive the motion vector of the current block using the merge index.

When the Motion vector Prediction (MVP) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor (230) may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder (240) may add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

As described above, intra-prediction may be performed for the current block, and, herein, for example, the intra-prediction modes may include 2 non-directional intra-prediction modes and 33 directional intra-prediction modes. Herein, the intra-prediction modes number 0 to number 1 indicate the non-directional intra-prediction modes, wherein the intra-prediction mode number 0 indicates a Planar mode, and the intra-prediction mode number 1 indicates an intra DC mode. The remaining intra-prediction modes number 2 to number 34 correspond to the directional intra-prediction mode and may each have a prediction directionality. The directional intra-prediction mode may also be referred to as an angular mode. A prediction block for the current block may be generated based on one of the 35 intra-prediction modes.

Figure 3:
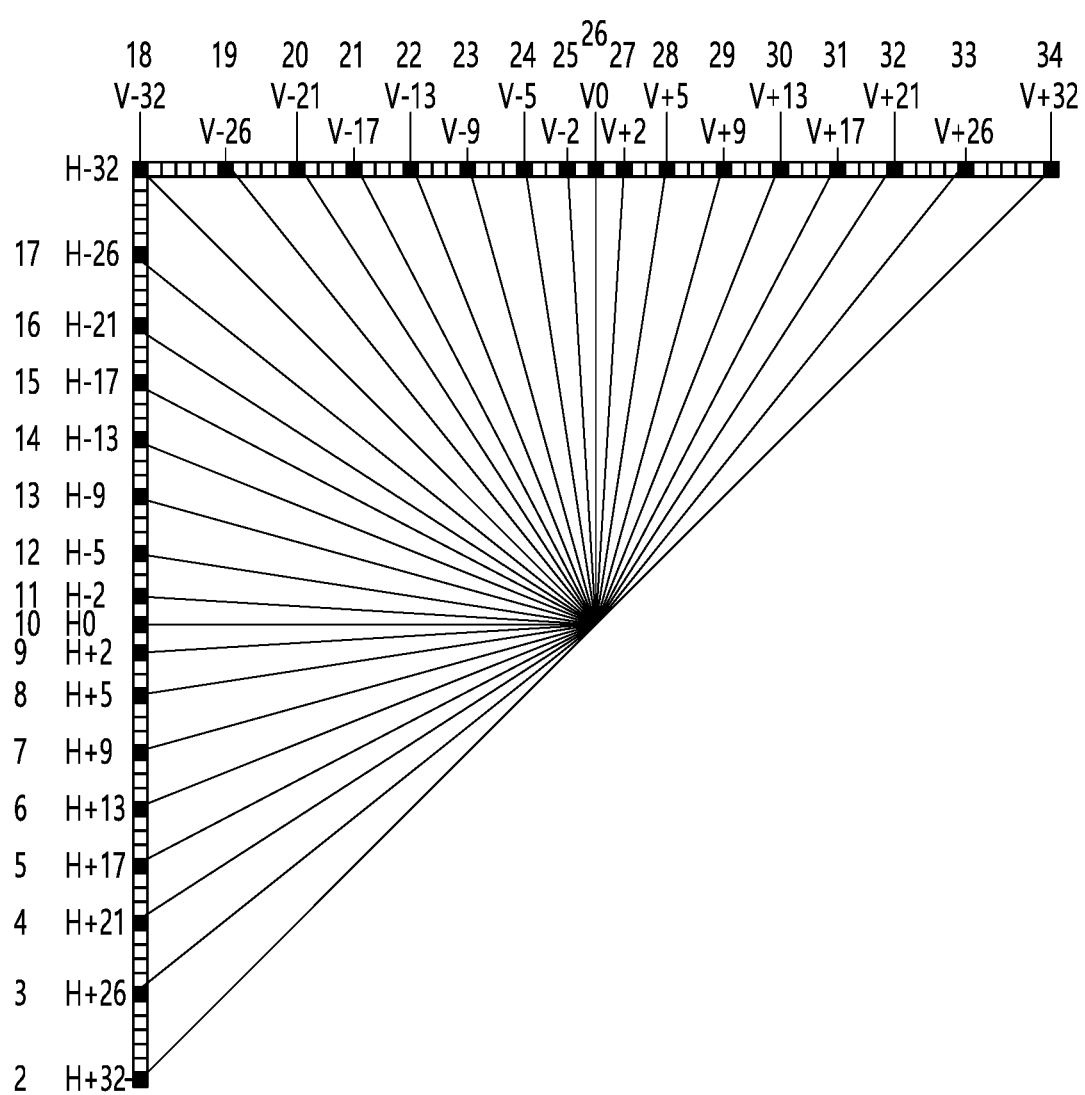
FIG. 3 shows examples of 33 prediction directionalities of the directional intra-prediction modes.

FIG. 3 shows examples of 33 prediction directionalities of the directional intra-prediction modes.

Referring to FIG. 3, based on the intra-prediction mode number 18 having an upper-left diagonal prediction direction, the intra-prediction modes may be divided into intra-prediction modes having horizontal directionality and intra-prediction modes having vertical directionality. H and V of FIG. 3 respectively indicate horizontal directionality and vertical directionality, and each of the numbers ranging from −32 to 32 (−32~32) indicates a 1/32-unit displacement within a sample grid position. Each of the intra-prediction modes number 2 to number 17 has a horizontal directionality, and each of the intra-prediction modes number 18 to number 34 has a vertical directionality. Intra-prediction mode number 10 indicates a horizontal intra-prediction mode or horizontal mode, and intra-prediction mode number 26 indicates a vertical intra-prediction mode or vertical mode. And, based on these modes (or intra-prediction modes), the prediction directions of an angular intra mode may be expressed in degrees. In other words, based on a horizontal reference angle of 0° corresponding to the intra-prediction mode number 10, a relative angle corresponding to each intra-prediction mode may be expressed. And, based on a vertical reference angle of 0° corresponding to the intra-prediction mode number 26, a relative angle corresponding to each intra-prediction mode may be expressed.

Meanwhile, a specific prediction sample of the current block may be generated based neighboring samples of the current block (e.g., upper-side samples and left-side samples of the current block), and, depending upon the prediction direction of the intra-prediction mode of the current block, the generated specific prediction sample may be copied (or duplicated). More specifically, the specific prediction sample may be generated based on a neighboring sample positioned along the prediction direction with reference to the specific prediction sample. And, other prediction samples excluding the specific prediction sample of the current block positioned along the prediction direction may be generated to have the same value as the specific prediction sample. As described above, in the intra-prediction, prediction samples may be generated by being simply copied (or duplicated), and, accordingly, error may be increased as distance between the prediction sample and its neighboring sample(s) becomes greater (or longer).

The present disclosure proposes a linear interpolation prediction in order to further enhance prediction accuracy of intra-prediction. The linear interpolation prediction may also be referred to as linear interpolation intra-prediction. In the linear interpolation prediction, right-side neighboring samples and lower-side neighboring samples of the current block may be generated, and a prediction sample may be generated through interpolation between a first reference sample being positioned along a prediction direction of an intra-prediction mode of the current block, among left-side neighboring samples and upper-side neighboring samples of the current block, and a second reference sample corresponding to the first reference sample, among right-side neighboring samples and lower-side neighboring samples. More specifically, among the right-side neighboring samples and the lower-side neighboring samples, the prediction sample may be generated through interpolation between the second reference sample being position along an opposite direction of the prediction direction of an intra-prediction mode of the current block and the first reference sample. Meanwhile, in case a position of the first reference sample or the second reference sample corresponds to a fractional sample position, a sample value of the first reference sample or the second reference sample may be derived through an interpolation between integer samples each neighboring on (or being adjacent to) left and right sides of the first reference sample or the second reference sample.

Meanwhile, the present disclosure proposes a method in which the linear interpolation intra-prediction modes is applied instead of the above-described planar mode. More specifically, in case the planar mode is applied to the current block, instead of using the conventional method of deriving a prediction sample, a method of deriving the prediction sample through the linear interpolation intra-prediction mode may be used. More specifically, in case the planar mode is applied to the current block, the prediction sample may be derived as described below.

Figure 4:
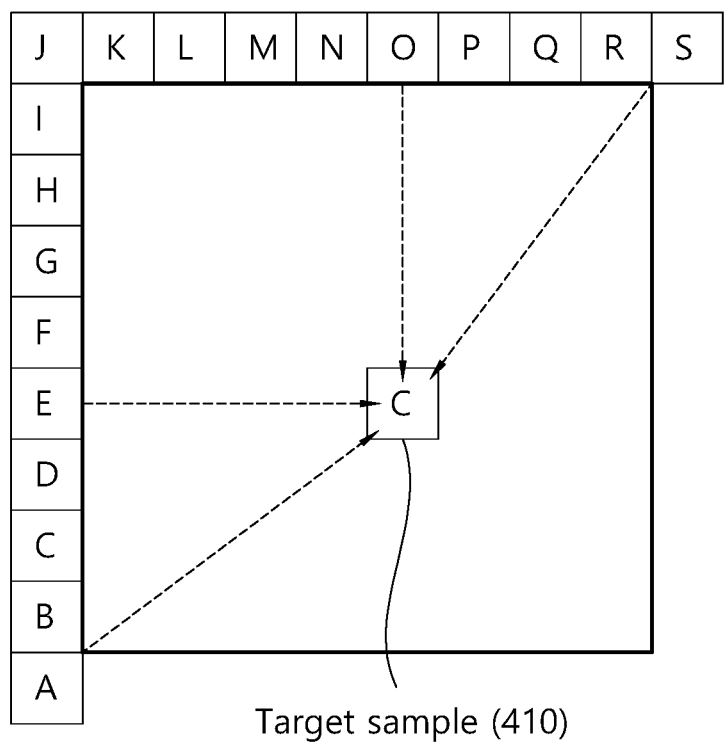
FIG. 4 shows an exemplary generation of a prediction sample of the current block, in a case where the planar mode is applied to the current block.

FIG. 4 shows an exemplary generation of a prediction sample of the current block, in a case where the planar mode is applied to the current block. Referring to FIG. 4, a prediction sample of a target sample (410) of the current block may be derived based on a neighboring sample 0, a neighboring sample S, a neighboring sample E, and a neighboring sample A of the current block. More specifically, a prediction sample of the target sample (410) may be generated by a linear interpolation of the neighboring sample 0 being positioned in the same column as the target sample (410), among the upper-side neighboring samples of the current block, the neighboring sample E being positioned in the same row as the target sample (410), among the left-side neighboring samples of the current block, an upper-right neighboring sample S of the current block, and a lower-left neighboring sample A of the current block. Herein, in case the same size of the current block is equal to N×N, and, in case each of an x element and a y element of a upper-left sample position of the current block is equal to 0, the lower-left neighboring sample may correspond to p[−1][N], and the upper-right neighboring sample may correspond to p[N][−1].

Meanwhile, in case the planar mode is applied to the aforementioned current block, a method of deriving the prediction sample may be reference to as a peculiar case of the above-described linear interpolation prediction. More specifically, since lower-side neighboring samples and right-side neighboring samples of the current block are not recovered according to a decoding order at an encoding/decoding point of the current block, the upper-right neighboring sample and the lower-left neighboring sample may be used for deriving the prediction sample. Accordingly, in case the above-described linear interpolation prediction is applied to the current block, thereby generating the right-side neighboring samples and the lower-side neighboring samples of the current block, the present disclosure proposes a method of deriving the prediction sample of the target sample based on neighboring samples positioned in the same column as the target sample and neighboring samples positioned in the same row as the target sample.

Figure 5:
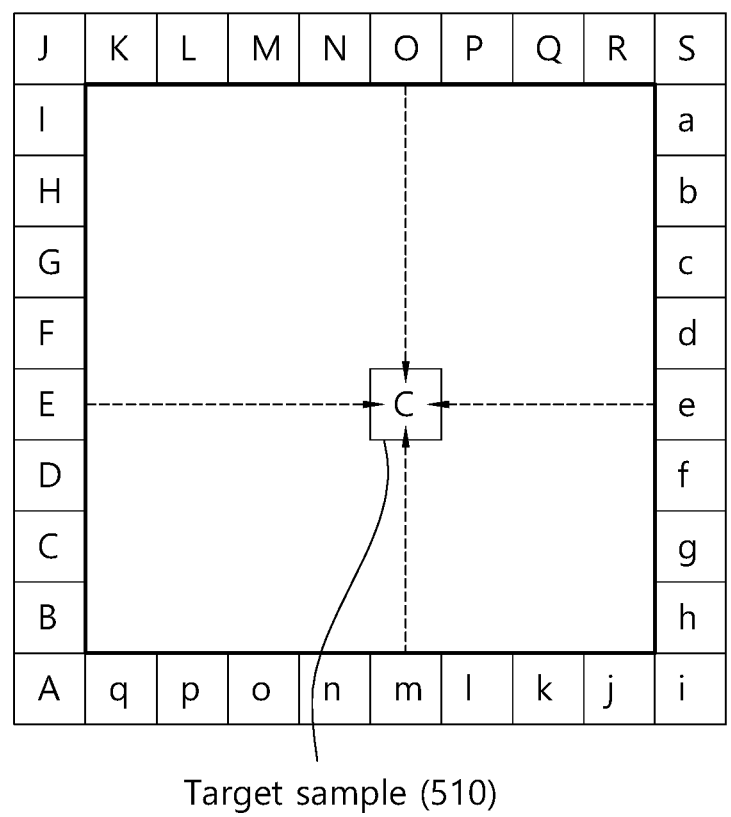
FIG. 5 shows an exemplary generation of a prediction sample through linear interpolation prediction in a case where linear interpolation prediction is applied to the current block, thereby generating right-side neighboring samples and lower-side neighboring sample of the current block, and where a planar mode is applied to the current block.

FIG. 5 shows an exemplary generation of a prediction sample through linear interpolation prediction in a case where linear interpolation prediction is applied to the current block, thereby generating right-side neighboring samples and lower-side neighboring sample of the current block, and in a case where a planar mode is applied to the current block. Referring to FIG. 5, the right-side neighboring samples and the lower-side neighboring samples of the current block may be generated, and, in case of applying a new planar mode to the current block, a prediction sample of the target sample (510) may be generated through linear interpolation of neighboring samples being positioned in the same column as the target sample (510) of the current block and neighboring samples being positioned in the same row as the target sample (510). The new planar mode may represent a case where linear interpolation is applied to the current block and where an intra-prediction mode of the current block is derived by using the planar mode. In case the linear interpolation prediction is used, and in case the intra-prediction mode of the current block corresponds to the Planar mode, a new planar mode applying the linear interpolation method may be used to generate a prediction block of the current block. More specifically, in case of applying a new planar mode, which is proposed in the present disclosure, referring to FIG. 5, a prediction sample of the target sample (510) may be generated by a linear interpolation of the neighboring sample 0 being positioned in the same column as the target sample (510), among the upper-side neighboring samples of the current block, the neighboring sample E being positioned in the same row as the target sample (510), among the lower-side neighboring samples of the current block, a lower-side neighboring sample m being positioned in the same column as the target sample (510), and, among the right-side neighboring samples of the current block, the neighboring sample e being positioned in the same row as target sample (510).

Meanwhile, in case an angular intra-prediction mode is applied to the current block, a prediction block of the current block may be generated based on linear interpolation intra-prediction. A detailed method for generating the prediction block based on the linear interpolation intra-prediction may be as described below.

Figure 6:
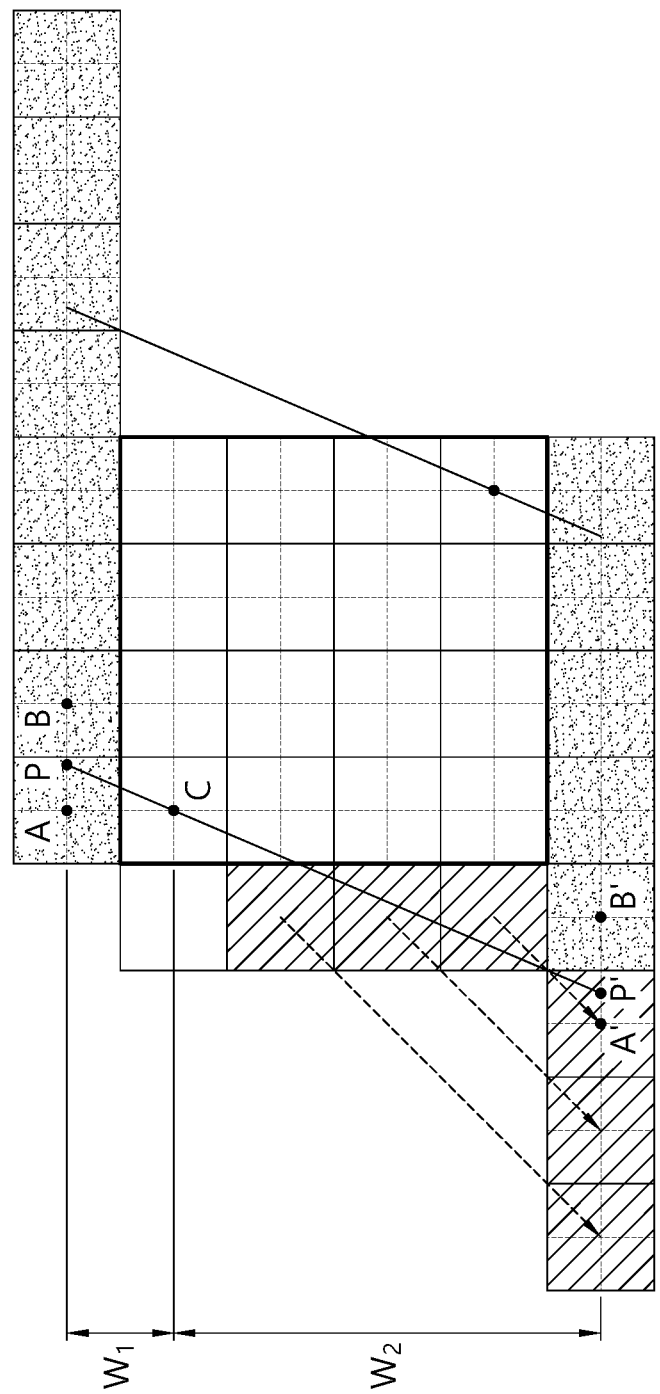
FIG. 6 shows an example wherein a prediction block is generated based on linear interpolation intra-prediction.

FIG. 6 shows an example wherein a prediction block is generated based on linear interpolation intra-prediction. Referring to FIG. 6, in case linear interpolation intra-prediction is performed on the current block, a lower-side reference sample that is not encoded/decoded at an encoding/decoding point of the current block may be generated, and a prediction block may be generated based on a weighted sum according to a distance between an upper-side reference sample that has already been encoded/decoded at the encoding/decoding point of the current block and the lower-side reference sample. For example, as shown in FIG. 6, upper-side reference sample P and lower-side reference sample P' may be generated, and a prediction sample of a target sample c within the current block may be derived by using a weighted sum of the upper-side reference sample P and the lower-side reference sample P'. A weighted value $w_1$ for the upper-side reference sample P may be derived based on a first distance between the target sample c and the upper-side reference sample P, and a weighted value $w_2$ for the lower-side reference sample P' may be derived based on a second distance between the target sample c and the lower-side reference sample P'. More specifically, the weighted value $w_1$ for the upper-side reference sample P and the weighted value $w_2$ for the lower-side reference sample P' may be derived based on a distance ratio between the first distance and the second distance. A prediction sample of the target sample c may be derived by a sum of a value obtained by multiplying the upper-side reference sample P by $w_1$ and a value obtained by multiplying the lower-side reference sample P' by $w_2$. Meanwhile, as shown in FIG. 6, in case a position of the upper-side reference sample P is a fractional sample position, a value of the upper-side reference sample P may be derived through an interpolation between integer samples A and B, which are respectively adjacent to the left and right sides of the upper-side reference sample P. Additionally, in case a position of the lower-side reference sample P' is a fractional sample position, a value of the lower-side reference sample P' may be derived through an interpolation between integer samples A' and B', which are respectively adjacent to the left and right sides of the lower-side reference sample P'.

As described above, the weighted value of the reference samples for a prediction sample of the target sample by determined based on distances between a target sample that is currently intended to be predicted and each of the reference samples. For example, as a distance between the target sample and a reference sample becomes greater (or longer), the value of the weighted value may become smaller. And, conversely, as a distance between the target sample and a reference sample becomes smaller (or shorter), the value of the weighted value may become larger (or greater). More specifically, as shown in FIG. 6, in order to derive a prediction sample of target sample c within the current block, the upper-side reference sample P and the lower-side reference sample P'. And, herein, since the first distance between the target sample c and the upper-side reference sample P is shorter (or closer) than the second distance between the target sample c and the lower-side reference sample P', the weighted value $w_1$ for the upper-side reference sample P may be allocated with a value that is greater than that of the weighted value $w_2$ for the lower-side reference sample P'. Meanwhile, herein, a reference sample may represent a neighboring sample being used for generating a prediction sample of the target sample, among the neighboring samples of the current block.

Meanwhile, as described above, although the weighted values may be allocated by reflecting the distances between the target sample and the reference samples, the weighted values may also be allocated by using other diverse methods. For example, a method of allocating the weighted values by using a cosine function and a method of allocating weighted values by using a least-squares method may be proposed herein.

Figure 7:
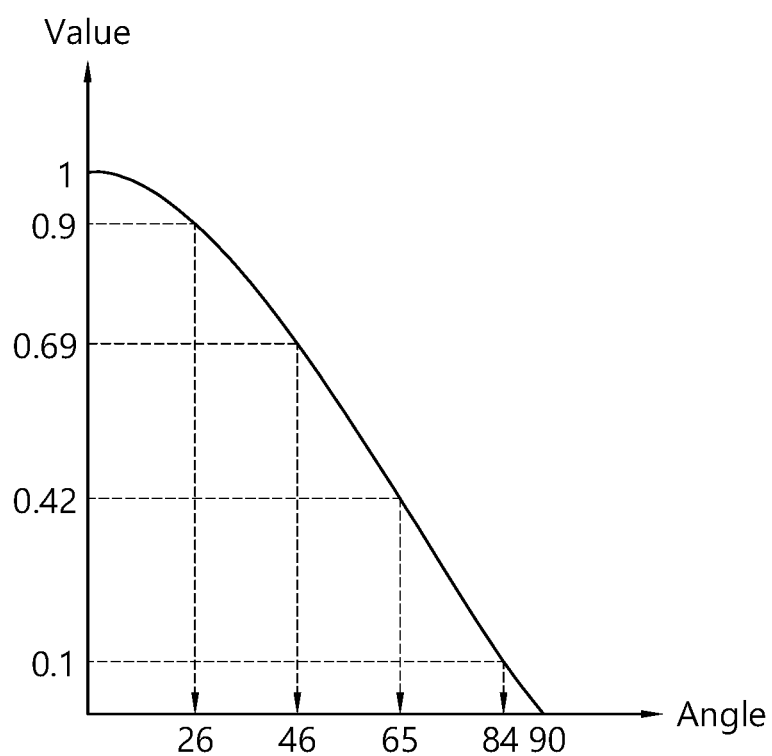
FIG. 7 shows an example of determining a weighted value of a reference sample for the target sample based on a cosine function.

FIG. 7 shows an example of determining a weighted value of a reference sample for the target sample based on a cosine function. Referring to FIG. 7, a weighted value of a reference sample for deriving a prediction same of the target sample within the current block by using the cosine function may be determined. For example, referring to FIG. 7, a maximum (or highest) weighted value and a minimum (or lowest) weighted value may be determined, and the maximum weighted value may be determined as 0.9, and the minimum weighted value may be determined as 0.1. The maximum weighted value may be determined to have a random value other than 0.9, and the minimum weighted value may be determined to have a random value other than 0.1. An angle of the cosine function corresponding to the maximum weighted value may be configured as a starting angle, and an angle of the cosine function corresponding to the minimum weighted value may be configured as an ending angle. For example, in case the maximum weighted value is determined as 0.9 and the minimum weighted value is determined as 0.1, the starting angle may be set to 26 degrees, and the ending angle may be set to 84 degrees.

Subsequently, in case the size of the current block is equal to N×N, an angular range (or directionality range) starting from the starting angle to the ending angle may be divided by N−1. And, a cosine function value of an angle at the divided point may be used as a weighted value for deriving a prediction sample of a target sample within the current block. For example, in case the size of the current block is 4×4, the angular range of 58 degrees starting from the starting angle of 26 degrees to the ending angle of 84 degrees may be equally divided by 3. The angular range starting from the starting angle to the ending angle may be derived by subtracting the starting angle from the ending angle. As shown in FIG. 7, angles corresponding to the points being divided by 3 may be derived as 26 degrees, 46 degrees, 65 degrees, and 84 degrees. Cosine function values of 26 degrees, 46 degrees, 65 degrees, and 84 degrees may be respectively allocated as weighted values of the target sample based on distances between a target sample of the current block having the size of 4×4 and reference samples. For example, the cosine function value of 26 degrees may be allocated as a first weighted value for a first reference sample of a target sample being positioned in a first row of the current block, and a value obtained by subtracting the cosine function value of 26 degrees from 1 may be allocated as a second weighted value for a second reference sample of the target sample being positioned in the first row of the current block. Additionally, the cosine function value of 46 degrees may be allocated as a first weighted value for a first reference sample of a target sample being positioned in a second row of the current block, and a value obtained by subtracting the cosine function value of 46 degrees from 1 may be allocated as a second weighted value for a second reference sample of the target sample being positioned in the second row of the current block. Additionally, the cosine function value of 65 degrees may be allocated as a first weighted value for a first reference sample of a target sample being positioned in a third row of the current block, and a value obtained by subtracting the cosine function value of 65 degrees from 1 may be allocated as a second weighted value for a second reference sample of the target sample being positioned in the third row of the current block. Additionally, the cosine function value of 84 degrees may be allocated as a first weighted value for a first reference sample of a target sample being positioned in a fourth row of the current block, and a value obtained by subtracting the cosine function value of 84 degrees from 1 may be allocated as a second weighted value for a second reference sample of the target sample being positioned in the fourth row of the current block. Herein, in case the intra-prediction mode for the current block has a vertical directionality, the first reference sample may correspond to one of the upper-side neighboring samples, and the second reference sample may correspond to one of the lower-side neighboring samples. Alternatively, in case the intra-prediction mode for the current block has a horizontal directionality, the first reference sample may correspond to one of the left-side neighboring samples, and the second reference sample may correspond to one of the right-side neighboring samples. The weighted values for the reference samples of the target sample may be derived as shown below in the following table.

TABLE 1

| Position | Weighted values | |
| --- | --- | --- |
| | First weighted value ($w_1$) | Second weighted value ($w_2$) |
| Target sample positioned in first row | 0.9 | 0.1 |
| Target sample positioned in second row | 0.69 | 0.31 |
| Target sample positioned in third row | 0.42 | 0.58 |
| Target sample positioned in fourth row | 0.1 | 0.9 |

By using the above-described method, weighted values for blocks having diverse sizes, such as a block having the size of 8×8, a block having the size of 16×16, and so on, may be determined.

Meanwhile, weighted values for a target sample within the current block may also be determined based on the cosine function without configuring the maximum weighted value and the minimum weighted value. More specifically, the weighted value(s) for the target sample may be determined based on the cosine functions of 0 degree to 90 degrees.

Figure 8:
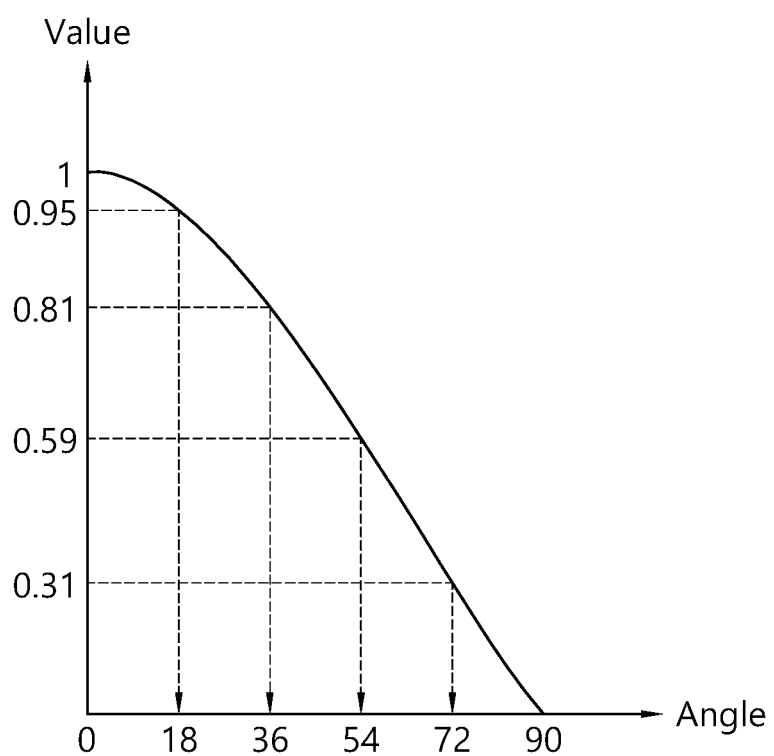
FIG. 8 shows another example of determining a weighted value of a reference sample for the target sample based on a cosine function.

FIG. 8 shows another example of determining a weighted value of a reference sample for the target sample based on a cosine function. Referring to FIG. 7, a weighted value of a reference sample for deriving a prediction same of the target sample within the current block by using the cosine function may be determined. For example, in case the size of the current block is equal to N×N, an angular range starting from 0 degree to 90 degrees may be divided by N+1. And, a cosine function value of an angle at the divided point may be used as a weighted value for deriving a prediction sample of a target sample within the current block. For example, in case the size of the current block is 4×4, angles corresponding to the points of the angular range starting from 0 degree to 90 degrees being equally divided by 5 may be derived as 0 degree, 18 degrees, 36 degrees, 54 degrees, 72 degrees, and 90 degrees. The cosine value of 0 degree may correspond to a row of the upper-side neighboring samples, and the cosine value of 90 degrees may correspond to the lower-side neighboring samples. And, cosine function values of 18 degrees, 36 degrees, 54 degrees, and 72 degrees may be respectively allocated as weighted values of the target sample based on distances between a target sample of the current block having the size of 4×4 and reference samples. For example, the cosine function value of 18 degrees may be allocated as a first weighted value for a first reference sample of a target sample being positioned in a first row of the current block, and a value obtained by subtracting the cosine function value of 18 degrees from 1 may be allocated as a second weighted value for a second reference sample of the target sample being positioned in the first row of the current block. Additionally, the cosine function value of 36 degrees may be allocated as a first weighted value for a first reference sample of a target sample being positioned in a second row of the current block, and a value obtained by subtracting the cosine function value of 36 degrees from 1 may be allocated as a second weighted value for a second reference sample of the target sample being positioned in the second row of the current block. Additionally, the cosine function value of 54 degrees may be allocated as a first weighted value for a first reference sample of a target sample being positioned in a third row of the current block, and a value obtained by subtracting the cosine function value of 54 degrees from 1 may be allocated as a second weighted value for a second reference sample of the target sample being positioned in the third row of the current block. Additionally, the cosine function value of 72 degrees may be allocated as a first weighted value for a first reference sample of a target sample being positioned in a fourth row of the current block, and a value obtained by subtracting the cosine function value of 72 degrees from 1 may be allocated as a second weighted value for a second reference sample of the target sample being positioned in the fourth row of the current block. Herein, in case the intra-prediction mode for the current block has a vertical directionality, the first reference sample may correspond to one of the upper-side neighboring samples, and the second reference sample may correspond to one of the lower-side neighboring samples. Alternatively, in case the intra-prediction mode for the current block has a horizontal directionality, the first reference sample may correspond to one of the left-side neighboring samples, and the second reference sample may correspond to one of the right-side neighboring samples. The weighted values for the reference samples of the target sample may be derived as shown below in the following table.

TABLE 2

| Position | Weighted values | |
| --- | --- | --- |
| | First weighted value ($w_1$) | Second weighted value ($w_2$) |
| Target sample positioned in first row | 0.95 | 0.05 |
| Target sample positioned in second row | 0.81 | 0.19 |

TABLE 2-continued

| | Weighted values | |
|---|---|---|
| Position | First weighted value ($w_1$) | Second weighted value ($w_2$) |
| Target sample positioned in third row | 0.59 | 0.41 |
| Target sample positioned in fourth row | 0.31 | 0.69 |

By using the above-described method, weighted values for blocks having diverse sizes, such as a block having the size of 8×8, a block having the size of 16×16, and so on, may be determined.

Figure 9:
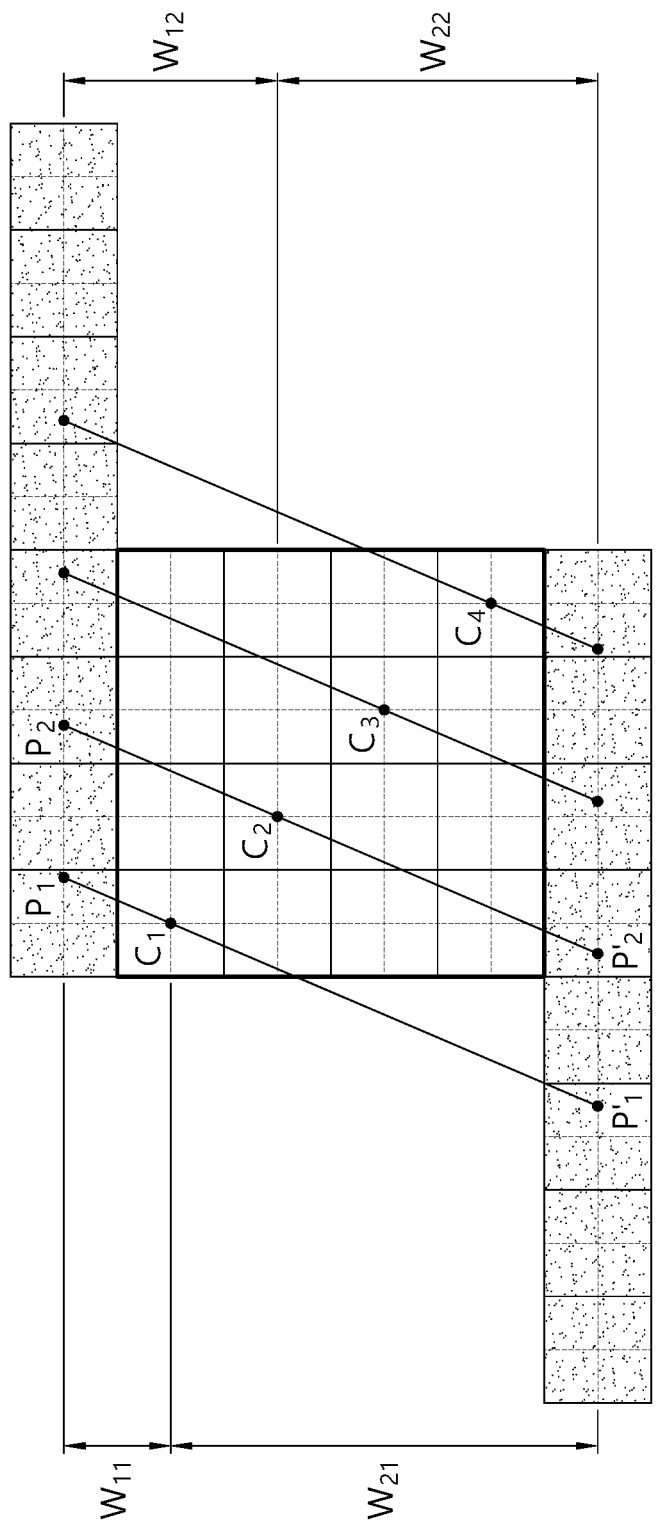
FIG. 9 shows an example wherein a prediction sample of a current block is generated based on weighted values being determined based on a cosine function and linear interpolation intra-prediction.

FIG. 9 shows an example wherein a prediction sample of a current block is generated based on weighted values being determined based on a cosine function and linear interpolation intra-prediction. Referring to FIG. 9, a target sample $C_1$ being positioned in a first row of the current block may be derived by using a weighted sum of $P_1$, which is positioned along a prediction direction of an intra-prediction mode of the current block with reference to the target sample $C_1$, and $P'_1$, which is positioned along a direction opposite to the prediction direction. By using the above-described method shown in FIG. 7, a value of 0.9 may be allocated as a first weighted value $w_{11}$ for $P_1$, and a value of 0.1 may be allocated as a second weighted value $w_{21}$ for $P'_1$. A prediction sample of the target sample $C_1$ may be derived as a sum of a value obtained by multiplying the first weighted value $w_{11}$ by $P_1$ and a value obtained by multiplying the second weighted value $w_{21}$ by $P'_1$.

Referring to FIG. 9, a target sample $C_2$ being positioned in a second row of the current block may be derived by using a weighted sum of $P_2$, which is positioned along a prediction direction of an intra-prediction mode of the current block with reference to the target sample $C_2$, and $P'_2$, which is positioned along a direction opposite to the prediction direction. By using the above-described method shown in FIG. 7, a value of 0.69 may be allocated as a first weighted value $w_{12}$ for $P_2$, and a value of 0.31 may be allocated as a second weighted value $w_{22}$ for $P'_2$. A prediction sample of the target sample $C_2$ may be derived as a sum of a value obtained by multiplying the first weighted value $w_{12}$ by $P_2$ and a value obtained by multiplying the second weighted value $w_{22}$ by $P'_2$.

Additionally, weighted values may be derived by using the above-described method shown in FIG. 8, and prediction samples may be derived based on the weighted values and neighboring samples of the current block. For example, by using the above-described method shown in FIG. 8, a value of 0.95 may be allocated as a first weighted value $w_{11}$ for $P_1$, and a value of 0.05 may be allocated as a second weighted value $w_{21}$ for $P'_1$. A prediction sample of the target sample $C_1$ may be derived as a sum of a value obtained by multiplying the first weighted value $w_{11}$ by $P_1$ and a value obtained by multiplying the second weighted value $w_{21}$ by $P'_1$.

For example, by using the above-described method shown in FIG. 8, a value of 0.81 may be allocated as a first weighted value $w_{12}$ for $P_2$, and a value of 0.19 may be allocated as a second weighted value $w_{22}$ for $P'_2$. A prediction sample of the target sample $C_2$ may be derived as a sum of a value obtained by multiplying the first weighted value $w_{12}$ by $P_2$ and a value obtained by multiplying the second weighted value $w_{22}$ by $P'_2$.

Meanwhile, by using the above-described methods, a weighted value that is derived from the cosine function may be fitted (or controlled or adjusted) for decreased complexity in calculation and enhanced convenience in hardware embodiment during an embodiment process within the system. For example, a weighted value that is derived from the cosine function may be configured to be represented as a $2^N$ combination that is most approximate (or similar) to the weighted value derived from the cosine function. More specifically, a first weighted value for a target sample of the current block may be configured as a $2^N$ combination that is most approximate (or similar) to a value that is derived from the cosine function, and a second weighted value for a target sample of the current block may be configured as a value obtained by subtracting the $2^N$ combination from 1.

For example, by using the above-described method shown in FIG. 7, in case a first weighted value for a first reference sample of a target sample positioned in a first row of the current block is derived as a cosine function value of 26 degrees, the value of first weighted value may be configured as a $2^N$ combination 0.875 most approximate (or similar) cosine function value 0.9 of 26 degrees. Additionally, in case a first weighted value for a first reference sample of a target sample positioned in a second row of the current block is derived as a cosine function value of 46 degrees, the value of first weighted value may be configured as a $2^N$ combination 0.6875 most approximate (or similar) cosine function value 0.69 of 46 degrees. Additionally, in case a first weighted value for a first reference sample of a target sample positioned in a third row of the current block is derived as a cosine function value of 65 degrees, the value of first weighted value may be configured as a $2^N$ combination 0.4375 most approximate (or similar) cosine function value 0.42 of 65 degrees. Additionally, in case a first weighted value for a first reference sample of a target sample positioned in a fourth row of the current block is derived as a cosine function value of 84 degrees, the value of first weighted value may be configured as a $2^N$ combination 0.125 most approximate (or similar) cosine function value 0.1 of 84 degrees.

$$0.9 = 1/2 + 1/4 + 1/8 = 0.875$$
$$0.69 = 1/2 + 1/8 + 1/16 = 0.6875$$
$$0.31 = 1/4 + 1/8 - 1/16 = 0.3125$$
$$0.42 = 1/4 + 1/8 + 1/16 = 0.4375$$
$$0.58 = 1/2 + 1/16 = 0.5625$$
$$0.1 = 1/8 = 0.125$$

[Equation 1]

Additionally, a first weighted value for the target sample being configured as a $2^N$ combination that is most approximate (or similar) to a value that is derived from the cosine function and a second weighted value for the target sample being configured as a value obtained by subtracting the $2^N$ combination from 1 may be derived as shown below in the following table.

TABLE 3

| | Weighted values | |
|---|---|---|
| Position | First weighted value ($w_1$) | Second weighted value ($w_2$) |
| Target sample positioned in first row | 0.875 | 0.125 |
| Target sample positioned in second row | 0.6875 | 0.3125 |

TABLE 3-continued

| | Weighted values | |
|---|---|---|
| Position | First weighted value ($w_1$) | Second weighted value ($w_2$) |
| Target sample positioned in third row | 0.4375 | 0.5625 |
| Target sample positioned in fourth row | 0.125 | 0.875 |

Meanwhile, by using the above-described method, cosine values for blocks having diverse sizes, such as a block having the size of 8×8, a block having the size of 16×16, and so on, may be derived, and $2^N$ combinations for the cosine values may be derived as weighted values for the blocks having diverse sizes.

Meanwhile, in case a prediction block of the current block is generated based on intra-prediction through linear interpolation, a weighted value for generating a prediction sample of the current block may be derived by using a least square method.

Figure 10:
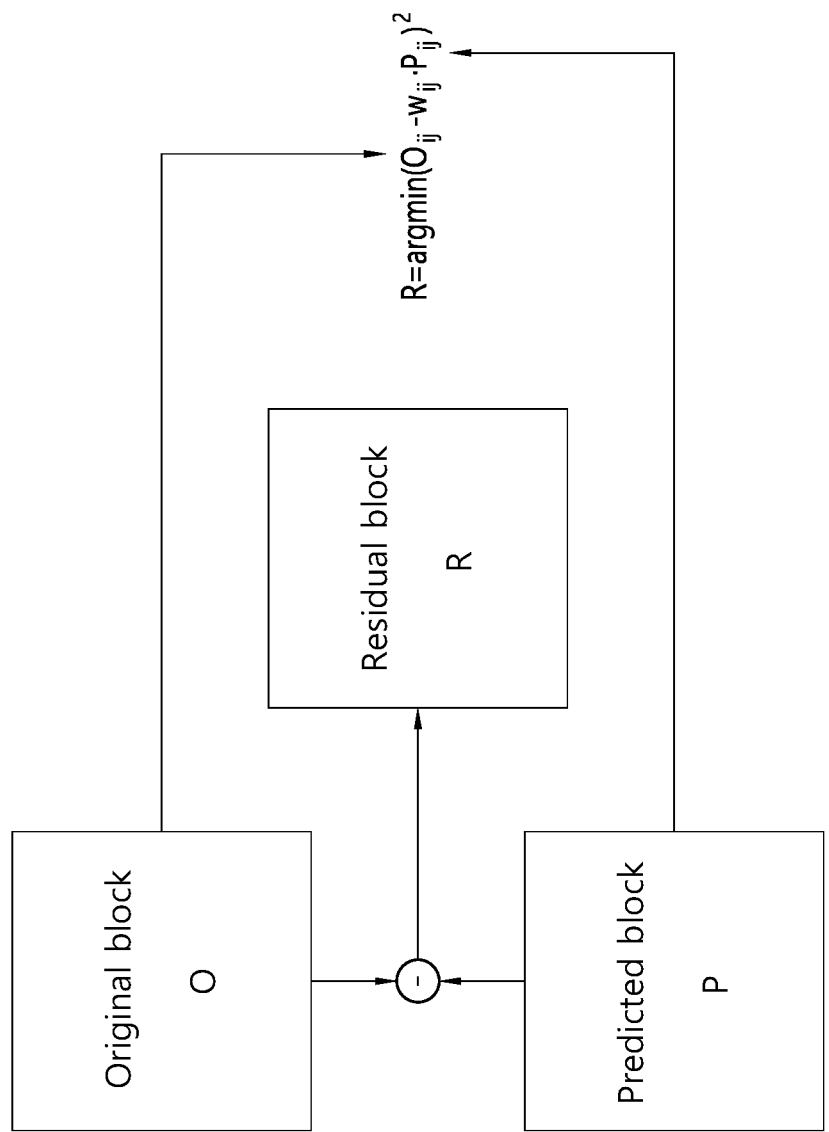
FIG. 10 shows an example of deriving weighted values for reference sampled of a target sample of the current block based on a least square method.

FIG. 10 shows an example of deriving weighted values for reference sampled of a target sample of the current block based on a least square method. Referring to FIG. 10, a weighted value may be calculated by using the least square method, so that a residual between an original target sample within an original block of the current block and a prediction sample of the generated target sample can be equal to a minimum value. Herein, the residual may indicate a difference between a sample value of the original target sample and a sample value of the generated prediction sample. Additionally, as shown in FIG. 10, argmin( ) may indicate a function for deriving the value of a parameter allowing the value of an equation, which is included in the parentheses, to be equal to a minimum value. The parameter being included in argmin( ) which is shown in FIG. 10, may correspond to $w_{ij}$. Additionally, the generated prediction sample may indicate a sample being generated based on a first reference sample and a second reference sample being derived based on a prediction direction of an intra-prediction mode of the current block with reference to the target sample. Meanwhile, the weighted value may be calculated per sample position. More specifically, the weighted values for the samples of the current block may be calculated. The weighted value for the target sample may be derived based on the equation presented below.

$$w_{i,j} = \frac{E(O_{ij}P_{ij})}{E(P_{ij}^2)} \quad \text{[Equation 2]}$$

Herein, $w_{ij}$ may indicate a weighted value for p[i][j], $O_{ij}$ may indicate an original sample value of the p[i][j], and $P_{ij}$ may indicate a generated sample value for the p[i][j]. The E( ) may indicate an operator representing an expectation value. Herein, in case the size of the current block is equal to N×N, and in case x element and y element of an upper-left sample position of the current block are both equal to 0, a target sample being positioned in an $i^{th}$ column and ar row of the current block may correspond to p[i][j]. Herein, the $i^{th}$ column may represent an $i^{th}$ column according to an order from left to right among the columns of the current block, and the $j^{th}$ row may represent a $j^{th}$ row according to an order from top to bottom among the rows of the current block.

Meanwhile, a weighted value for generating a prediction sample of a target sample within the current block may be calculated by using another method according to diverse conditions. For example, the weighted value may be calculated based on a size of the current block, or the weighted value may be calculated based on an intra-prediction mode of the current block. The weighted value that is derived based on diverse conditions and methods may be derived in advanced through offline learning. More specifically, the weighted value may be calculated through offline learning prior to the encoding/decoding process of the current block. And, in case the encoding/decoding process of the current block is performed, the calculated weighted value may be applied to the generation of the prediction sample of the target sample within the current block. Thus, residual for recovering the current block may be reduced, and the overlap coding efficiency may be enhanced.

Meanwhile, whether or not to perform linear interpolation intra-prediction of the current block may be derived based on a linear interpolation prediction flag. For example, in case the linear interpolation prediction flag indicates that the linear interpolation intra-prediction is performed on the current block, the linear interpolation intra-prediction may be performed on the current block, and, in case the linear interpolation prediction flag indicates that the linear interpolation intra-prediction is not performed on the current block, the linear interpolation intra-prediction may not be performed on the current block. In case the value of the linear interpolation prediction flag is equal to 1, the linear interpolation prediction flag may indicate that the linear interpolation intra-prediction is performed on the current block, and, in case the value of the linear interpolation prediction flag is equal to 0, the linear interpolation prediction flag may indicate that the linear interpolation intra-prediction is not performed on the current block. A syntax element of the linear interpolation prediction flag may be indicated as LIP_FLAG.

The linear interpolation prediction flag may be generated and encoded and, then, outputted from an encoding end, and, herein, in order to enhanced the encoding efficiency, the linear interpolation prediction flag may be encoded by using context-based adaptive binary arithmetic coding (CABAC). Additionally, in order to further enhance the encoding efficiency in the case where the linear interpolation prediction flag is encoded by using CABAC, a method of determining one context model, among multiple context models, based on statistical characteristics or spatial correlation of the linear interpolation prediction flag, and encoding the linear interpolation prediction flag based on the determined context model may be proposed.

For example, a method of determining a context model, among the plurality of context models, based on statistical characteristics of the linear interpolation prediction flag may be used. More specifically, a statistical ratio according to which the linear interpolation intra-prediction is performed in accordance with a block size or block format (squared or non-squared) may be considered, and different context models may be determined in accordance with the block size or block format. For example, in case a linear interpolation intra-prediction performance ratio for a block size of 4×4 and a block size of 8×8 is equal to 20%, and in case a linear interpolation intra-prediction performance ratio for a block size of 16×16 is equal to 50%, linear interpolation prediction flags of blocks based on 2 context models may be encoded, thereby further enhancing the coding efficiency. More specifically, in case the size of the current block is equal to or less than 8×8, the linear interpolation prediction flag of the current block may be encoded based on a $CM_{LIP\_FLAG1}$, wherein the linear interpolation intra-prediction performance ratio is initialized to 20%. And, in case the size of the current block is larger than 8×8, the linear interpolation prediction flag of the current block may be encoded based on a $CM_{LIP\_FLAG2}$, wherein the linear interpolation intra-prediction performance ratio is initialized to 50%. Herein, $CM_{LIP\_FLAG1}$ may indicate a context model (CM) having the linear interpolation intra-prediction performance ratio initialized to 20%, and $CM_{LIP\_FLAG2}$ may indicate a context model (CM) having the linear interpolation intra-prediction performance ratio initialized to 50%. According to the description presented above, as an example, among the plurality of context models, one context model may be determined based on a statistical characteristic that is different from the description presented above. More specifically, a linear interpolation prediction performance ratio according to a block size or format for an inputted image may be statistically analyzed, and, in accordance with the analysis result, the number and initial values of the context models being used may be determined and then used during the encoding/decoding process.

Additionally, as another example, a method of determining one context model, among the plurality of context models, based on a spatial correlation of the current block may be used. More specifically, based on whether or not linear interpolation intra-prediction of the neighboring blocks being adjacent to the current block is performed, a context model for the encoding/decoding of a linear interpolation prediction flag may be determined.

Figure 11:
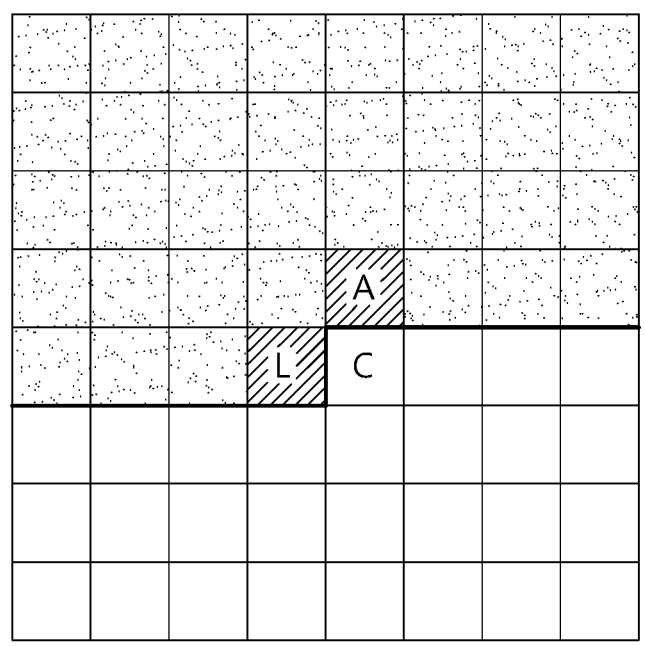
FIG. 11 shows an upper-side neighboring block and a left-side neighboring block both being adjacent to the current block for determining a context model for a linear interpolation prediction flag of the current block.

FIG. 11 shows an upper-side neighboring block and a left-side neighboring block both being adjacent to the current block for determining a context model for a linear interpolation prediction flag of the current block. Referring to FIG. 11, a context model for a linear interpolation prediction flag of the current block may be determined based on two neighboring blocks that are adjacent to the current block. Meanwhile, the context model for the linear interpolation intra-prediction of the current block may be determined based on a random number of neighboring blocks.

In case an upper-side neighboring block A of the current block C is processed with an encoding/decoding process by using the linear interpolation intra-prediction, and in case a left-side neighboring block L of the current block C is not processed with an encoding/decoding process by using the linear interpolation intra-prediction, a linear interpolation prediction flag of the current block may be encoded/decoded based on a context model having the linear interpolation intra-prediction performance ratio initialized to 50%. Herein, whether or not the linear interpolation intra-prediction of the upper-side neighboring block A and the linear interpolation intra-prediction of the left-side neighboring block L are performed may be respectively derived based on linear interpolation prediction flags for the upper-side neighboring block A and the left-side neighboring block L. As described above, CABAC based entropy coding may be performed based on the context model, and, thus, the coding efficiency may be further enhanced. Additionally, in case both the upper-side neighboring block A and the left-side neighboring block L of the current block C are processed with the encoding/decoding process by using the linear interpolation intra-prediction, the linear interpolation prediction flag of the current block may be encoded/decoded based on the context model having the linear interpolation intra-prediction performance ratio initialized to a likelihood that is greater than 50%. The context model for the linear interpolation intra-prediction of the current block may be derived as shown below in the following table.

TABLE 4

| Usage of linear interpolation prediction | | Context Model |
|---|---|---|
| Left-side block (L) | Upper-side block (A) | (CM) |
| X | X | $CM_{LIP\_FLAG1}$ |
| O | X | $CM_{LIP\_FLAG2}$ |
| X | O | |
| O | O | $CM_{LIP\_FLAG3}$ |

Referring to Table 4, in case the encoding/decoding process is not performed on the upper-side neighboring block A and left-side neighboring block L of the current block C by using the linear interpolation intra-prediction, the linear interpolation prediction flag of the current block may be encoded/decoded based on the context model having the linear interpolation intra-prediction performance ratio initialized to a likelihood that is less than 50%. $CM_{LIP\_FLAG1}$ may indicate the context model having the linear interpolation intra-prediction performance ratio initialized to a likelihood that is less than 50%. For example, $CM_{LIP\_FLAG1}$ may indicate a context model having the linear interpolation intra-prediction performance ratio initialized to 20%.

Additionally, referring to Table 4, in case the encoding/decoding process is performed on the upper-side neighboring block A of the current block C by using the linear interpolation intra-prediction, and in case the encoding/decoding process is not performed on the left-side neighboring block L of the current block C by using the linear interpolation intra-prediction, the linear interpolation prediction flag of the current block may be encoded/decoded based on the context model having the linear interpolation intra-prediction performance ratio initialized to 50%. Additionally, in case the encoding/decoding process is not performed on the upper-side neighboring block A of the current block C by using the linear interpolation intra-prediction, and in case the encoding/decoding process is performed on the left-side neighboring block L of the current block C by using the linear interpolation intra-prediction, the linear interpolation prediction flag of the current block may be encoded/decoded based on the context model having the linear interpolation intra-prediction performance ratio initialized to 50%. $CM_{LIP\_FLAG2}$ may indicate the context model having the linear interpolation intra-prediction performance ratio initialized to 50%.

Additionally, referring to Table 4, in case the encoding/decoding process is performed on the upper-side neighboring block A and left-side neighboring block L of the current block C by using the linear interpolation intra-prediction, the linear interpolation prediction flag of the current block may be encoded/decoded based on the context model having the linear interpolation intra-prediction performance ratio initialized to a likelihood that is greater than 50%. $CM_{LIP\_FLAG3}$ may indicate the context model having the linear interpolation intra-prediction performance ratio initialized to a likelihood that is greater than 50%.

Figure 12:
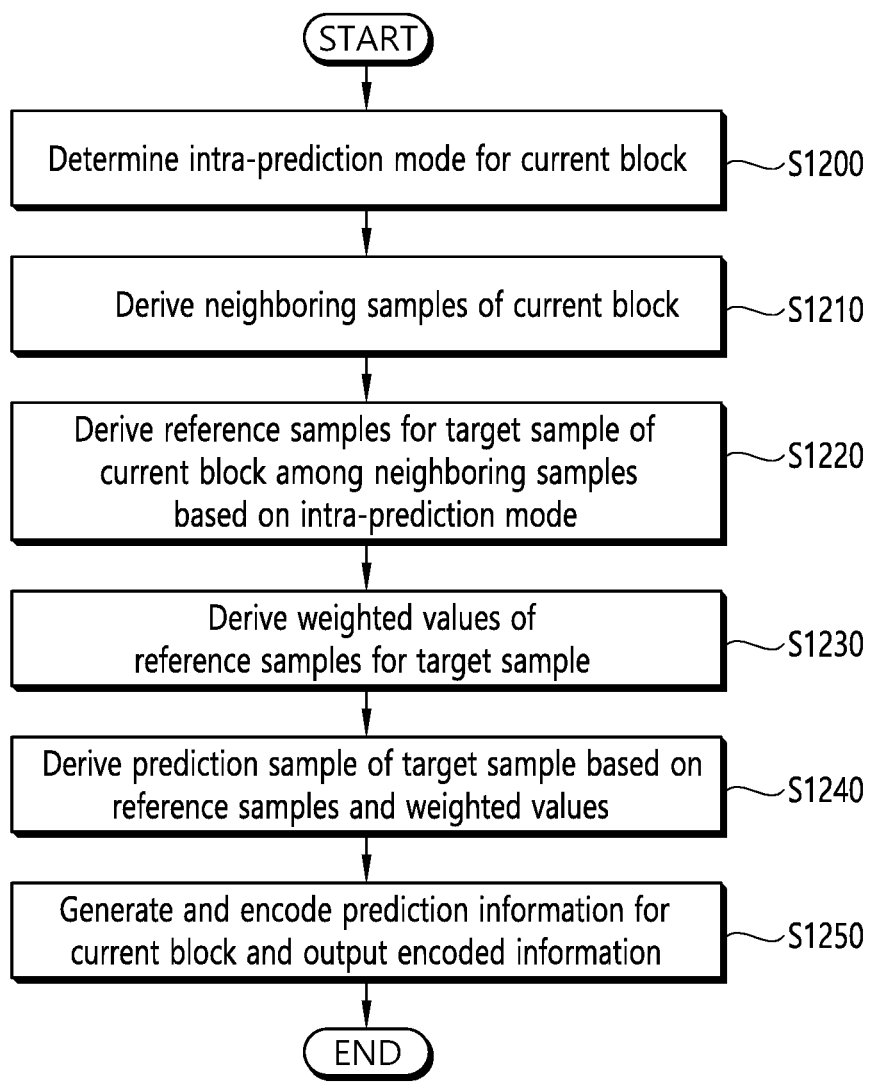
FIG. 12 shows a general view of a video encoding method by an encoding device according to the present disclosure.

FIG. 12 shows a general view of a video encoding method by an encoding device according to the present disclosure. The method disclosed in FIG. 12 may be performed by an encoding device, which is disclosed in FIG. 1. More specifically, for example, steps S1200 to S1240 of FIG. 12 may be performed by a predictor of the encoding device, and step S1250 may be performed by an entropy encoder of the encoding device.

An encoding device determines an intra-prediction mode for a current block (S1200). The encoding device may perform diverse intra-prediction modes so as to derive an intra-prediction mode having an optimal RD cost. The intra-prediction mode may correspond to one of 2 non-directional intra-prediction modes and 33 directional intra-prediction modes. As described above, the 2 non-directional intra-prediction modes may include an intra DC mode and an intra planar mode.

Meanwhile, the encoding device may determine whether or not to perform linear interpolation intra-prediction of the current block. In case the linear interpolation intra-prediction is performed on the current block, a first reference sample being positioned along a prediction direction of the intra-prediction mode with reference to a target sample of the current block and a second reference sample being positioned along a direction opposite to the prediction direction may be derived, and a prediction sample of the target sample may be generated based on linear interpolation of the first reference sample and the second reference sample. In this case, a linear interpolation flag indicating whether or not the linear interpolation intra-prediction of the current block is performed. In case the value of the linear interpolation prediction flag is equal to 1, the linear interpolation prediction flag may indicate that the linear interpolation intra-prediction is performed on the current block, and, in case the value of the linear interpolation prediction flag is equal to 0, the linear interpolation prediction flag may indicate that the linear interpolation intra-prediction is not performed on the current block.

The encoding device derives neighboring samples of the current block (S1210). The encoding device may derive neighboring samples of the current block. The neighboring samples may include left-side neighboring samples, an upper left-side neighboring sample, and upper-side neighboring samples. The left-side neighboring samples, the upper left-side neighboring samples, and the upper-side neighboring samples may be derived from neighboring blocks that have already been recovered at a decoding time point of the current block. Herein, in case the block size of the current block is equal to N×N, and, in case an x element and a y element of the top-left sample of the current block are both equal to 0, the left-side neighboring samples may correspond to p[−1][0] to p[−1][N−1], the upper left-side neighboring sample may correspond to p[−1][−1], and the upper-side neighboring samples may correspond to p[0][−1] to p[N−1][−1].

Additionally, the neighboring samples may include a lower right-side neighboring sample, lower-side neighboring samples, and right-side neighboring samples. For example, the lower right-side neighboring sample may be derived based on a lower left side neighboring sample and an upper right-side neighboring sample of the current block. Additionally, the lower-side neighboring samples may be derived based on the lower left-side neighboring sample and the lower right-side neighboring sample. For example, the lower-side neighboring samples may be derived based on a linear interpolation of the lower left-side neighboring sample and the lower right-side neighboring sample. Additionally, the right-side neighboring samples may be derived based on the upper right-side neighboring sample and the lower right-side neighboring sample. For example, the right-side neighboring samples may be derived based on a linear interpolation of the upper right-side neighboring sample and the lower right-side neighboring sample. Herein, in case the block size of the current block is equal to N×N, and, in case an x element and a y element of the top-left sample of the current block are both equal to 0, the lower-side neighboring samples may correspond to p[0][N] to p[N−1][N], the lower right-side neighboring sample may correspond to p[N][N], the right-side neighboring samples may correspond to p[N][N−1] to p[N][0], the lower left-side neighboring sample may correspond to p[−1][N], and the upper right-side neighboring sample may correspond to p[N][−1].

The encoding device derives reference samples for a target sample of the current block, among the neighboring samples, based on the intra-prediction mode (S1220). The encoding device may derive reference samples for the target sample based on the intra-prediction mode.

For example, in case the intra-prediction mode is an angular intra-prediction and linear interpolation intra-prediction is performed on the current block, reference samples for the target sample may include a first reference sample being positioned along a prediction direction of the intra-prediction mode with reference to the target sample of the current block and a second reference sample being positioned along a direction opposite to the prediction direction.

Additionally, as another example, in case the intra-prediction mode is a planar intra-prediction mode, and in case linear interpolation intra-prediction is performed on the current block, reference samples for the target sample may include a first reference sample, a second reference sample, a third reference sample, and a fourth reference sample. Herein, the first reference sample may correspond to a neighboring sample being positioned in the same column as the target sample, among the upper-side neighboring samples of the current block. The second reference sample may correspond to a neighboring sample being positioned in the same column as the target sample, among the lower-side neighboring samples of the current block. The third reference sample may correspond to a neighboring sample being positioned in the same row as the target sample, among the left-side neighboring samples. And, the fourth reference sample may correspond to a neighboring sample being positioned in the same row as the target sample, among the right-side neighboring samples.

The encoding device derives weighted values of the reference samples for the target sample (S1230). The encoding device may derive weighted values of the reference samples for the target sample.

For example, the reference samples for the target sample may include a first reference sample being positioned along a prediction direction of the intra-prediction mode with reference to the target sample of the current block and a second reference sample being positioned along a direction opposite to the prediction direction. In this case, a first weighted value of the first reference sample and a second weighted value of the second reference sample may be derived based on a cosine function. Meanwhile, in case the intra-prediction mode for the current block has a vertical directionality, the first reference sample may correspond to one of the upper-side neighboring samples, and the second reference sample may correspond to one of the lower-side neighboring samples. Alternatively, in case the intra-prediction mode for the current block has a horizontal directionality, the first reference sample may correspond to one of the left-side neighboring samples, and the second reference sample may correspond to one of the right-side neighboring samples. More specifically, for example, in case the target sample corresponds to one of multiple samples of an $n^{th}$ row of the current block, and in case the first reference sample corresponds to one of the upper-side neighboring samples of the current block, a weighted value for the first reference sample may be derived as cosine((90n)/(N+1)), and a weighted value for the second reference sample may be derived as 1−cosine((90n)/(N+1)). Herein, the $n^{th}$ row may indicate an $n^{th}$ row, among the rows of the current block, according to a top-to-bottom order. Additionally, for example, in case the target sample corresponds to one of multiple samples of an $n^{th}$ column of the current block, and in case the first reference sample corresponds to one of the left-side neighboring samples of the current block, a weighted value for the first reference sample may be derived as cosine((90n)/(N+1)), and a weighted value for the second reference sample may be derived as 1−cosine((90n)/(N+1)). Herein, the $n^{th}$ column may indicate an $n^{th}$ column, among the columns of the current block, according to a left-to-right order.

Additionally, for example, the target sample may correspond to one of multiple samples of an $n^{th}$ row of the current block, and a maximum weighted value and a minimum weighted value may be configured for the first weighted value. In this case, an angle of a cosine function corresponding to the maximum weighted value may be indicated as starting angle a, and an angle of a cosine function corresponding to the minimum weighted value may be indicated as ending angle b. More specifically, starting angle a of the cosine function corresponding to the maximum weighted value may be configured, and ending angle b of the cosine function corresponding to the minimum weighted value may be configured. In case the first reference sample corresponds to one of the upper-side neighboring samples of the current block, a first weighted value for the first reference sample may be derived as $$\cos\left(a + \frac{(b-a)(n-1)}{(N-1)}\right),$$

and a second weighted value for the second reference sample may be derived as $$1 - \cos\left(a + \frac{(b-a)(n-1)}{(N-1)}\right).$$

Herein, the $n^{th}$ row may indicate an $n^{th}$ row, among the rows of the current block, according to a top-to-bottom order. Additionally, in case the target sample corresponds to one of multiple samples of an $n^{th}$ column of the current block, and in case the first reference sample corresponds to one of the left-side neighboring samples of the current block, a first weighted value for the first reference sample may be derived as $$\cos\left(a + \frac{(b-a)(n-1)}{(N-1)}\right),$$

and a second weighted value for the second reference sample may be derived as $$1 - \cos\left(a + \frac{(b-a)(n-1)}{(N-1)}\right).$$

Herein, the $n^{th}$ column may indicate an $n^{th}$ column, among the columns of the current block, according to a left-to-right order.

Additionally, as another example, a temporary first weighted value for a first reference sample of the target sample may be derived based on the cosine function, and a $2^m$ combination for the temporary first weighted value may be derived as a first weighted value of the first reference sample. Herein, the $2^m$ combination for the temporary first weighted value may indicate a $2^m$ combination most similar (or approximate) to the temporary first weighted value, and the $2^m$ combination may indicate values being configured of m-th power values of 2. In this case, a second weighted value for a second reference sample of the target sample may be derived from a value obtained by subtracting the second weighted value for the second reference sample of the target sample from 1.

Meanwhile, a first weighted value of the first reference sample for the target sample and a second weighted value of the second reference sample for the target sample may be predetermined.

For example, the predetermined first weighted value and the second weighted value may correspond to values minimizing a difference between a sample value of an original sample of the target sample and a sample value of a prediction sample of the target sample that is generated based on the first reference sample and the second reference sample. Additionally, the predetermined first weighted value and the second weighted value may be derived based on the above-described Equation 1. Additionally, the predetermined first weighted value and the second weighted value may be derived based on diverse methods and may also be derived by using another method according to diverse conditions.

The encoding device derives a prediction sample of the target sample based on the reference samples and the weighted values (S1240). For example, the reference samples for the target sample may include a first reference sample being positioned along a prediction direction of the intra-prediction mode with reference to the target sample of the current block, among the neighboring samples, and a second reference sample being positioned along a direction opposite to the prediction direction. The prediction sample of the target sample may be derived based on the first reference sample, the second reference sample, a first weighted value for the first reference sample, and a second weighted value for the second reference sample. More specifically, the prediction sample of the target sample may be generated by using a weighted sum of the first reference sample and the second reference sample.

Additionally, as another example, in case the intra-prediction mode is a planar intra-prediction mode, and in case linear interpolation intra-prediction is performed on the current block, reference samples for the target sample may include a first reference sample, a second reference sample, a third reference sample, and a fourth reference sample. The prediction sample may be derived based on the first reference sample, the second reference sample, the third reference sample, and the fourth reference sample. More specifically, a prediction sample may be generated through a linear interpolation between the first reference sample, second reference sample, and third reference sample and the fourth reference sample. Additionally, weighted values for the first reference sample, the second reference sample, the third reference sample, and the fourth reference sample may be derived. The prediction sample of the target sample may be derived based on the first reference sample, the second reference sample, the third reference sample, and the fourth reference sample and the weighted values of the reference samples. More specifically, the prediction sample may be generated by using a weighted sum of the first reference sample, the second reference sample, the third reference sample, and the fourth reference sample.

The encoding device generates, encodes, and outputs prediction information for the current block (S1250). The encoding device may encode the prediction information for the current block and may then output the encoded information in a bitstream format. The prediction information may include information on the intra-prediction mode of the current block. The encoding device may generate information on an intra-prediction mode indicating the intra-prediction mode, encode the generated information, and then output the encoded information in a bitstream format. The information on the intra-prediction mode may include information directly indicating an intra-prediction mode for the current block, or the information on the intra-prediction mode may also include information indicating any one candidate from an intra-prediction mode candidate list, which is derived based on an intra-prediction mode of a left-side or upper-side block of the current block.

Additionally, the prediction information may include linear interpolation prediction flag indicating whether or not linear interpolation intra-prediction of the current block is performed. In case the linear interpolation prediction flag indicates that the linear interpolation intra-prediction is performed on the current block, the linear interpolation intra-prediction may be performed on the current block, and, in case the linear interpolation prediction flag indicates that the linear interpolation intra-prediction is not performed on the current block, the linear interpolation intra-prediction may not be performed on the current block. In case the value of the linear interpolation prediction flag is equal to 1, the linear interpolation prediction flag may indicate that the linear interpolation intra-prediction is performed on the current block, and, in case the value of the linear interpolation prediction flag is equal to 0, the linear interpolation prediction flag may indicate that the linear interpolation intra-prediction is not performed on the current block. A syntax element of the linear interpolation prediction flag may be indicated as LIP_FLAG.

Additionally, the linear interpolation prediction flag may be encoded by using context-based adaptive binary arithmetic coding (CABAC).

More specifically, for example, a context model for the linear interpolation flag may be determined based on a size of the current block, and the linear interpolation flag of the current block may be encoded based on the determined context model. For example, in case the size of the current block is equal to or less than 8×8, the linear interpolation prediction flag of the current block may be encoded based on a context model, wherein the linear interpolation intra-prediction performance ratio is initialized to 20%. And, in case the size of the current block is larger than 8×8, the linear interpolation prediction flag of the current block may be encoded based on a context model, wherein the linear interpolation intra-prediction performance ratio is initialized to 50%.

Additionally, as another example, a context model for the linear interpolation flag may be determined based on a format of the current block, and the linear interpolation flag of the current block may be encoded based on the determined context model. More specifically, a context model of the linear interpolation flag may be determined based on whether or not the current block is a non-square shape.

Additionally, as another example, a context model for a linear interpolation flag of the current block may be determined based on whether or not linear interpolation intra-prediction is performed on neighboring blocks that are adjacent to the current block, and the linear interpolation prediction flag of the current block may be encoded based on the determined context model. For example, in case an upper-side block and a left-side block of the current block are not encoded by using the linear interpolation intra-prediction, a linear interpolation prediction flag of the current block may be encoded based on a context model, wherein the linear interpolation intra-prediction performance ratio is initialized to a likelihood less than 50%. For example, the linear interpolation prediction flag of the current block may be encoded based on a context model, wherein the linear interpolation intra-prediction performance ratio is initialized to 20%.

Additionally, in case only one of the upper-side block and the left-side block of the current block is encoded by using the linear interpolation intra-prediction, the linear interpolation prediction flag of the current block may be encoded based on a context model, wherein the linear interpolation intra-prediction performance ratio is initialized to 50%.

Additionally, in case the upper-side block and the left-side block of the current block are encoded by using the linear interpolation intra-prediction, the linear interpolation prediction flag of the current block may be encoded based on a context model, wherein a linear interpolation intra-prediction performance ratio is initialized to a likelihood greater than 50%. For example, the linear interpolation prediction flag of the current block may be encoded based on a context model, wherein a linear interpolation intra-prediction performance ratio is initialized to 70%. The context model for the linear interpolation prediction flag of the current block may be derived based on the above-described Table 4.

Figure 13:
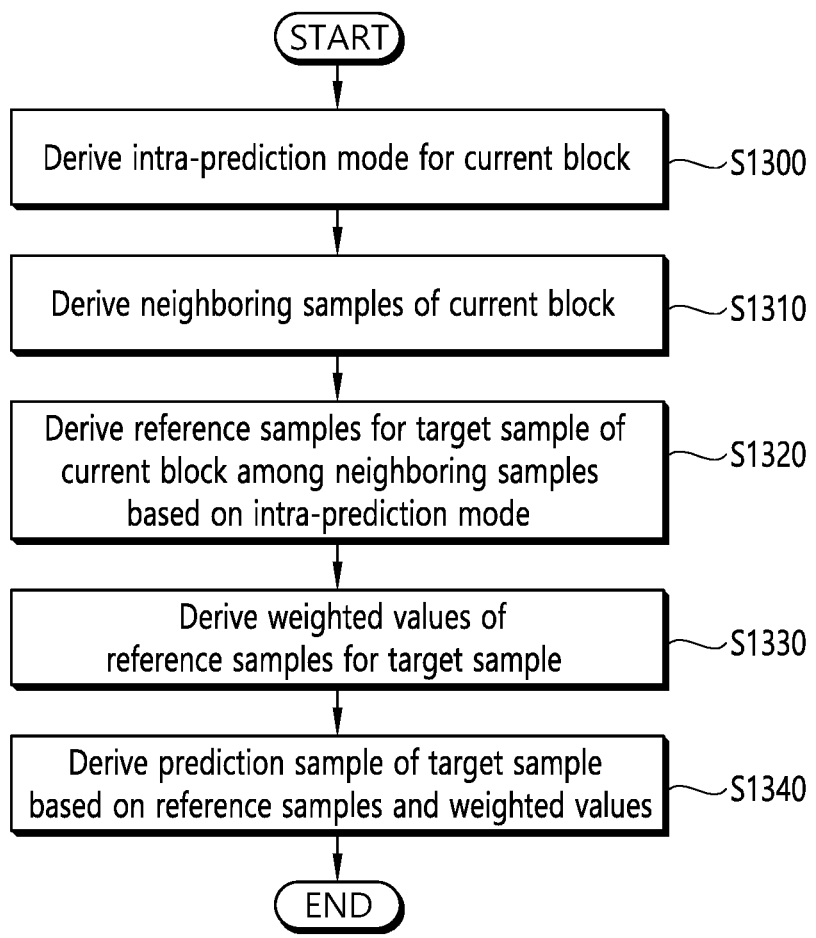
FIG. 13 shows a general view of a video decoding method by a decoding device according to the present disclosure.

FIG. 13 shows a general view of a video decoding method by a decoding device according to the present disclosure. The method disclosed in FIG. 13 may be performed by a decoding device, which is disclosed in FIG. 2. More specifically, for example, steps S1300 to S1340 of FIG. 13 may be performed by a predictor of the decoding device.

The decoding device derives an intra-prediction mode for the current block (S1300). The decoding device may acquire prediction information for the current block through a bitstream. The prediction information may include information directly indicating an intra-prediction mode for the current block, or the prediction information may also include information indicating any one of multiple candidates listed in an intra-prediction mode candidate list, which is derived based on an intra-prediction mode of a left-side or upper-side block of the current mode. The decoding device may derive an intra-prediction mode for the current block based on the acquired prediction information. The intra-prediction mode may correspond to one of 2 non-directional intra-prediction modes and 33 directional intra-prediction modes. As described above, the 2 non-directional intra-prediction modes may include an intra DC mode and an intra planar mode.

Meanwhile, a linear interpolation prediction flag indicating whether or not to perform linear interpolation intra-prediction of the current block may be included. Whether or not to perform the linear interpolation intra-prediction of the current block may be determined based on the linear interpolation prediction flag. More specifically, whether or not to perform the linear interpolation intra-prediction of the current block may be derived based on the linear interpolation prediction flag. In case the linear interpolation prediction flag indicates that the linear interpolation intra-prediction is performed on the current block, the linear interpolation intra-prediction may be performed on the current block, and, in case the linear interpolation prediction flag indicates that the linear interpolation intra-prediction is not performed on the current block, the linear interpolation intra-prediction may not be performed on the current block. In case the value of the linear interpolation prediction flag is equal to 1, the linear interpolation prediction flag may indicate that the linear interpolation intra-prediction is performed on the current block, and, in case the value of the linear interpolation prediction flag is equal to 0, the linear interpolation prediction flag may indicate that the linear interpolation intra-prediction is not performed on the current block. A syntax element of the linear interpolation prediction flag may be indicated as LIP_FLAG.

Additionally, the linear interpolation prediction flag may be decoded by using context-based adaptive binary arithmetic coding (CABAC).

More specifically, for example, a context model for the linear interpolation flag may be determined based on a size of the current block, and the linear interpolation flag of the current block may be decoded based on the determined context model. For example, in case the size of the current block is equal to or less than 8×8, the linear interpolation prediction flag of the current block may be decoded based on a context model, wherein the linear interpolation intra-prediction performance ratio is initialized to 20%. And, in case the size of the current block is larger than 8×8, the linear interpolation prediction flag of the current block may be decoded based on a context model, wherein the linear interpolation intra-prediction performance ratio is initialized to 50%.

Additionally, as another example, a context model for the linear interpolation flag may be determined based on a format of the current block, and the linear interpolation flag of the current block may be decoded based on the determined context model. More specifically, a context model of the linear interpolation flag may be determined based on whether or not the current block is a non-square shape.

Additionally, as another example, a context model for a linear interpolation flag of the current block may be determined based on whether or not linear interpolation intra-prediction is performed on neighboring blocks that are adjacent to the current block, and the linear interpolation prediction flag of the current block may be decoded based on the determined context model. For example, in case an upper-side block and a left-side block of the current block are not decoded by using the linear interpolation intra-prediction, a linear interpolation prediction flag of the current block may be decoded based on a context model, wherein the linear interpolation intra-prediction performance ratio is initialized to a likelihood less than 50%. For example, the linear interpolation prediction flag of the current block may be decoded based on a context model, wherein the linear interpolation intra-prediction performance ratio is initialized to 20%.

Additionally, in case only one of the upper-side block and the left-side block of the current block is decoded by using the linear interpolation intra-prediction, the linear interpolation prediction flag of the current block may be decoded based on a context model, wherein the linear interpolation intra-prediction performance ratio is initialized to 50%.

Additionally, in case the upper-side block and the left-side block of the current block are decoded by using the linear interpolation intra-prediction, the linear interpolation prediction flag of the current block may be decoded based on a context model, wherein a linear interpolation intra-prediction performance ratio is initialized to a likelihood greater than 50%. For example, the linear interpolation prediction flag of the current block may be decoded based on a context model, wherein a linear interpolation intra-prediction performance ratio is initialized to 70%. The context model for the linear interpolation prediction flag of the current block may be derived based on the above-described Table 4.

The decoding device derives neighboring samples of the current block (S1310). The decoding device may derive neighboring samples of the current block. The neighboring samples may include left-side neighboring samples, an upper left-side neighboring sample, and upper-side neighboring samples. The left-side neighboring samples, the upper left-side neighboring sample, and the upper-side neighboring samples may be derived from neighboring blocks that have already been recovered at a decoding time point of the current block. Herein, in case the block size of the current block is equal to N×N, and, in case an x element and a y element of the top-left sample of the current block are both equal to 0, the left-side neighboring samples may correspond to $p[-1][0]$ to $p[-1][N-1]$, the upper left-side neighboring sample may correspond to $p[-1][-1]$, and the upper-side neighboring samples may correspond to $p[0][-1]$ to $p[N-1][-1]$.

Additionally, the neighboring samples may include a lower right-side neighboring sample, lower-side neighboring samples, and right-side neighboring samples. For example, the lower right-side neighboring sample may be derived based on a lower left-side neighboring sample and an upper right-side neighboring sample of the current block. Additionally, the lower-side neighboring samples may be derived based on the lower left-side neighboring sample and the lower right-side neighboring sample. For example, the lower-side neighboring samples may be derived based on a linear interpolation of the lower left-side neighboring sample and the lower right-side neighboring sample. Additionally, the right-side neighboring samples may be derived based on the upper right-side neighboring sample and the lower right-side neighboring sample. For example, the right-side neighboring samples may be derived based on a linear interpolation of the upper right-side neighboring sample and the lower right-side neighboring sample. Herein, in case the block size of the current block is equal to N×N, and, in case an x element and a y element of the top-left sample of the current block are both equal to 0, the lower-side neighboring samples may correspond to $p[0][N]$ to $p[N-1][N]$, the lower right-side neighboring sample may correspond to $p[N][N]$, the right-side neighboring samples may correspond to $p[N][N-1]$ to $p[N][0]$, the lower left-side neighboring sample may correspond to $p[-1][N]$, and the upper right-side neighboring sample may correspond to $p[N][-1]$.

The decoding device derives reference samples for a target sample of the current block, among the neighboring samples, based on the intra-prediction mode (S1320). The decoding device may derive reference samples for the target sample based on the intra-prediction mode.

For example, in case the intra-prediction mode is an angular intra-prediction and linear interpolation intra-prediction is performed on the current block, reference samples for the target sample may include a first reference sample being positioned along a prediction direction of the intra-prediction mode with reference to the target sample of the current block and a second reference sample being positioned along a direction opposite to the prediction direction.

Additionally, as another example, in case the intra-prediction mode is a planar intra-prediction mode, and in case linear interpolation intra-prediction is performed on the current block, reference samples for the target sample may include a first reference sample, a second reference sample, a third reference sample, and a fourth reference sample. Herein, the first reference sample may correspond to a neighboring sample being positioned in the same column as the target sample, among the upper-side neighboring samples of the current block. The second reference sample may correspond to a neighboring sample being positioned in the same column as the target sample, among the lower-side neighboring samples of the current block. The third reference sample may correspond to a neighboring sample being positioned in the same row as the target sample, among the left-side neighboring samples. And, the fourth reference sample may correspond to a neighboring sample being positioned in the same row as the target sample, among the right-side neighboring samples.

The decoding device derives weighted values of the reference samples for the target sample (S1330). The decoding device may derive weighted values of the reference samples for the target sample.

For example, the reference samples for the target sample may include a first reference sample being positioned along a prediction direction of the intra-prediction mode with reference to the target sample of the current block and a second reference sample being positioned along a direction opposite to the prediction direction. In this case, a first weighted value of the first reference sample and a second weighted value of the second reference sample may be derived based on a cosine function. Meanwhile, in case the intra-prediction mode for the current block has a vertical directionality, the first reference sample may correspond to one of the upper-side neighboring samples, and the second reference sample may correspond to one of the lower-side neighboring samples. Alternatively, in case the intra-prediction mode for the current block has a horizontal directionality, the first reference sample may correspond to one of the left-side neighboring samples, and the second reference sample may correspond to one of the right-side neighboring samples. More specifically, for example, in case the target sample corresponds to one of multiple samples of an $n^{th}$ row of the current block, and in case the first reference sample corresponds to one of the upper-side neighboring samples of the current block, a weighted value for the first reference sample may be derived as cosine$((90n)/(N+1))$, and a weighted value for the second reference sample may be derived as $1-$cosine$((90n)/(N+1))$. Herein, the $n^{th}$ row may indicate an $n^{th}$ row, among the rows of the current block, according to a top-to-bottom order. Additionally, for example, in case the target sample corresponds to one of multiple samples of an $n^{th}$ column of the current block, and in case the first reference sample corresponds to one of the left-side neighboring samples of the current block, a weighted value for the first reference sample may be derived as cosine$((90n)/(N+1))$, and a weighted value for the second reference sample may be derived as $1-$cosine$((90n)/(N+1))$. Herein, the $n^{th}$ column may indicate an $n^{th}$ column, among the columns of the current block, according to a left-to-right order.

Additionally, for example, the target sample may correspond to one of multiple samples of an $n^{th}$ row of the current block, and a maximum weighted value and a minimum weighted value may be configured for the first weighted value. In this case, an angle of a cosine function corresponding to the maximum weighted value may be indicated as starting angle a, and an angle of a cosine function corresponding to the minimum weighted value may be indicated as ending angle b. More specifically, starting angle a of the cosine function corresponding to the maximum weighted value may be configured, and ending angle b of the cosine function corresponding to the minimum weighted value may be configured. In case the first reference sample corresponds to one of the upper-side neighboring samples of the current block, a first weighted value for the first reference sample may be derived as $$\cos\left(a + \frac{(b-a)(n-1)}{(N-1)}\right),$$

and a second weighted value for the second reference sample may be derived as $$1 - \cos\left(a + \frac{(b-a)(n-1)}{(N-1)}\right).$$

Herein, the $n^{th}$ row may indicate an $n^{th}$ row, among the rows of the current block, according to a top-to-bottom order. Additionally, in case the target sample corresponds to one of multiple samples of an $n^{th}$ column of the current block, and in case the first reference sample corresponds to one of the left-side neighboring samples of the current block, a first weighted value for the first reference sample may be derived as $$\cos\left(a + \frac{(b-a)(n-1)}{(N-1)}\right),$$

and a second weighted value for the second reference sample may be derived as $$1 - \cos\left(a + \frac{(b-a)(n-1)}{(N-1)}\right).$$

Herein, the $n^{th}$ column may indicate an $n^{th}$ column, among the columns of the current block, according to a left-to-right order.

Additionally, as another example, a temporary first weighted value for a first reference sample of the target sample may be derived based on the cosine function, and a $2^m$ combination for the temporary first weighted value may be derived as a first weighted value of the first reference sample. Herein, the $2^m$ combination for the temporary first weighted value may indicate a $2^m$ combination most similar (or approximate) to the temporary first weighted value, and the $2^m$ combination may indicate values being configured of m-th power values of 2. In this case, a second weighted value for a second reference sample of the target sample may be derived from a value obtained by subtracting the second weighted value for the second reference sample of the target sample from 1.

Meanwhile, a first weighted value of the first reference sample for the target sample and a second weighted value of the second reference sample for the target sample may be predetermined.

For example, the predetermined first weighted value and the second weighted value may correspond to values minimizing a difference between a sample value of an original sample of the target sample and a sample value of a prediction sample of the target sample that is generated based on the first reference sample and the second reference sample. Additionally, the predetermined first weighted value and the second weighted value may be derived based on the above-described Equation 1. Additionally, the predetermined first weighted value and the second weighted value may be derived based on diverse methods and may also be derived by using another method according to diverse conditions.

The decoding device derives a prediction sample of the target sample based on the reference samples and the weighted values (S1340). For example, the reference samples for the target sample may include a first reference sample being positioned along a prediction direction of the intra-prediction mode with reference to the target sample of the current block, among the neighboring samples, and a second reference sample being positioned along a direction opposite to the prediction direction. The prediction sample of the target sample may be derived based on the first reference sample, the second reference sample, a first weighted value for the first reference sample, and a second weighted value for the second reference sample. More specifically, the prediction sample of the target sample may be generated by using a weighted sum of the first reference sample and the second reference sample.

Meanwhile, in case the position of the first reference sample or the second reference sample corresponds to a fractional sample position, a sample value of the first reference sample or the second reference sample through an interpolation between integer samples neighboring left and right sides of the first reference sample or the second reference sample.

Additionally, as another example, in case the intra-prediction mode is a planar intra-prediction mode, and in case linear interpolation intra-prediction is performed on the current block, reference samples for the target sample may include a first reference sample, a second reference sample, a third reference sample, and a fourth reference sample. The prediction sample may be derived based on the first reference sample, the second reference sample, the third reference sample, and the fourth reference sample. More specifically, a prediction sample may be generated through a linear interpolation between the first reference sample, second reference sample, and third reference sample and the fourth reference sample. Additionally, weighted values for the first reference sample, the second reference sample, the third reference sample, and the fourth reference sample may be derived. The prediction sample of the target sample may be derived based on the first reference sample, the second reference sample, the third reference sample, and the fourth reference sample and the weighted values of the reference samples. More specifically, the prediction sample may be generated by using a weighted sum of the first reference sample, the second reference sample, the third reference sample, and the fourth reference sample.

Meanwhile, although it is not shown in the drawing, a decoding device may immediately use the prediction sample according to the prediction mode as a recovery sample, or a residual sample may be added to the prediction sample, thereby generating a recovery sample. In case a residual sample for the target block exists, the decoding device may receive information on a residual for the target block, and the information on the residual may be included in information on the phase. The information on the residual may include a conversion coefficient on the residual sample. The decoding device may derive the residual sample (or residual sample array) on the target block based on the residual information. The decoding device may generate a recovery sample based on the prediction sample and the residual sample, and a recovery block or recovery picture may be derived based on the recovery sample. Thereafter, as described above, in order to enhance subjective/objective picture quality, whenever needed, the decoding device may adopt deblocking filtering and/or in-loop filtering procedure, such as a SAO procedure, to the recovery picture.

According to the above-described present disclosure, by performing intra-prediction based on at least one neighboring sample, among a plurality of neighboring samples, prediction accuracy of the current block may be enhanced, thereby enhancing the overall coding efficiency.

Additionally, according to the present disclosure, in case a planar mode for a current block is applied, intra-prediction is performed based on neighboring samples of the same column as a target sample of the current block and neighboring samples of the same row as the target sample, so as to enhance prediction accuracy of the current block, thereby enhancing the overall coding efficiency.

Additionally, according to the present disclosure, reference samples for a target sample of a current block may be derived based on an intra-prediction mode for the current block, and a prediction sample of the target sample may be derived by using a weighted sum of the neighboring samples by deriving weighted values of the neighboring samples based on a cosine function. Thus, prediction accuracy of the current block may be enhanced, thereby enhancing the overall coding efficiency.

Furthermore, according to the present disclosure, a context model for coding information on whether or not to perform linear interpolation intra-prediction of a current block may be determined based on diverse conditions, and information on whether or not to perform the linear interpolation intra-prediction of the current block based on the determined context model may be coded. Thus, prediction accuracy on the current block may be enhanced, and the overall coding efficiency may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well-known means. The processor may comprise an application-specific integrated circuit (ASIC), other chipsets, a logic circuit and/or a data processing device. The memory may include a read-only memory (ROM), a random access memory (RAM), a flash memory, a memory card, a storage medium, and/or other storage device.

What is claimed is:

1. An intra-prediction method performed by a decoding device, comprising:
deriving an intra-prediction mode for a current block;
deriving neighboring samples of the current block;
deriving reference samples for a target sample of the current block, among the neighboring samples, based on the intra-prediction mode;
deriving weighted values of the reference samples for the target sample; and
deriving a prediction sample of the target sample based on the reference samples and the weighted values,
wherein the reference samples for the target sample include a first reference sample being positioned along a prediction direction of the intra-prediction mode based on the target sample, among the neighboring samples, and a second reference sample being positioned along a direction opposite to the prediction direction,
wherein the prediction sample of the target sample is derived based on a weighted sum of the first reference sample and the second reference sample, and
wherein a first weighted value for the first reference sample and a second weighted value for the second reference sample are pre-configured values minimizing a difference between a sample value of an original sample of the target sample and a sample value of the prediction sample of the target sample.

2. The intra-prediction method of claim 1, wherein the neighboring samples of the current block include lower-side neighboring samples, a lower right-side neighboring sample, right-side neighboring samples, and an upper right-side neighboring sample,
wherein when a sample size of the current block is equal to N×N, and x element and y element of a top-left sample position of the current block are both equal to 0, the lower-side neighboring samples are p[0][N] to p[N−1][N], the lower right-side neighboring sample are p[N][N], and the right-side neighboring samples are p[N][N−1] to p[N][0].

3. The intra-prediction method of claim 2, wherein, when the intra-prediction mode of the current block is a planar intra-prediction mode, the reference samples for the target sample include the first reference sample, the second reference sample, a third reference sample, and a fourth reference sample,
wherein the first reference sample is a neighboring sample being positioned in a same column as the target sample among upper-side neighboring samples of the current block,
wherein the second reference sample is a neighboring sample being positioned in a same column as the target sample among the lower-side neighboring samples of the current block,
wherein the third reference sample is a neighboring sample being positioned in a same row as the target sample among left-side neighboring samples of the current block, and
wherein the fourth reference sample is a neighboring sample being positioned in a same row as the target sample among right-side neighboring samples of the current block.

4. The intra-prediction method of claim 1, wherein prediction information including a linear interpolation prediction flag through a bitstream is acquired, and whether or not to perform linear interpolation intra-prediction of the current block is derived based on the linear interpolation prediction flag.

5. The intra-prediction method of claim 4, wherein a context model for the linear interpolation flag is determined based on a size of the current block, and
wherein the linear interpolation flag of the current block is decoded based on the determined context model.

6. The intra-prediction method of claim 4, wherein a context model for the linear interpolation flag of the current block is determined based on whether linear interpolation intra-prediction of neighboring blocks adjacent to the current block is performed, and
wherein the linear interpolation flag of the current block is decoded based on the determined context model.

7. A decoding device for performing image decoding based on intra-prediction, comprising:
an entropy decoder configured for acquiring prediction information for a current block; and
a predictor configured for deriving neighboring samples of the current block, deriving reference samples for a target sample of the current block, among the neighboring samples, based on the intra-prediction mode, deriving weighted values of reference samples for the target sample, and deriving a prediction sample of the target sample based on the reference samples and the weighted values,
wherein the reference samples for the target sample include a first reference sample being positioned along a prediction direction of the intra-prediction mode based on the target sample, among the neighboring samples, and a second reference sample being positioned along a direction opposite to the prediction direction,
wherein the prediction sample of the target sample is derived based on a weighted sum of the first reference sample and the second reference sample, and
wherein a first weighted value for the first reference sample and a second weighted value for the second reference sample are pre-configured values minimizing a difference between a sample value of an original sample of the target sample and a sample value of the prediction sample of the target sample.

8. The device of claim 7, wherein, when an intra-prediction mode of the current block is a planar intra-prediction mode, the reference samples for the target sample include the first reference sample, the second reference sample, a third reference sample, and a fourth reference sample,
wherein the first reference sample is a neighboring sample being positioned in a same column as the target sample among upper-side neighboring samples of the current block,
wherein the second reference sample is a neighboring sample being positioned in a same column as the target sample among lower-side neighboring samples of the current block,
wherein the third reference sample is a neighboring sample being positioned in a same row as the target sample among left-side neighboring samples of the current block, and
wherein the fourth reference sample is a neighboring sample being positioned in a same row as the target sample among right-side neighboring samples of the current block.

* * * * *